(12) United States Patent
Ishizaki et al.

(10) Patent No.: US 9,183,422 B2
(45) Date of Patent: *Nov. 10, 2015

(54) WIRELESS COMMUNICATION SYSTEM, WIRELESS COMMUNICATION METHOD, RADIO EQUIPMENT, AND DATA TRANSMITTER

(75) Inventors: Haruya Ishizaki, Kanagawa (JP); Masayuki Mizuno, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 1094 days.

This patent is subject to a terminal disclaimer.

(21) Appl. No.: 13/230,501

(22) Filed: Sep. 12, 2011

(65) Prior Publication Data

US 2012/0062369 A1 Mar. 15, 2012

(30) Foreign Application Priority Data

Sep. 13, 2010 (JP) ................................. 2010-204307
Jan. 17, 2011 (JP) ................................. 2011-006831

(51) Int. Cl.
*G06K 7/10* (2006.01)
*G06K 7/00* (2006.01)
*H04L 1/00* (2006.01)

(52) U.S. Cl.
CPC .......... *G06K 7/10009* (2013.01); *G06K 7/0008* (2013.01); *H04L 1/0003* (2013.01)

(58) Field of Classification Search
USPC ............ 340/10.3–10.42, 12.51, 13.26–13.29, 340/13.1; 370/281, 295; 375/349
See application file for complete search history.

(56) References Cited

U.S. PATENT DOCUMENTS

| | | | |
|---|---|---|---|
| 6,496,112 B1* | 12/2002 | Vega | 340/572.1 |
| 6,559,754 B1* | 5/2003 | Amtmann | 340/10.51 |
| 7,215,976 B2* | 5/2007 | Brideglall | 455/552.1 |
| 7,400,989 B2* | 7/2008 | Chapman et al. | 702/81 |
| 7,420,458 B1* | 9/2008 | Kuzma et al. | 340/10.34 |
| 8,072,314 B1* | 12/2011 | Kuzma et al. | 340/10.4 |
| 8,362,961 B2* | 1/2013 | Gualtieri | 343/742 |
| 2004/0002300 A1* | 1/2004 | Ballantyne | 455/1 |
| 2005/0163260 A1* | 7/2005 | Abe | 375/341 |
| 2006/0049916 A1* | 3/2006 | Kuriki | 340/10.1 |

(Continued)

FOREIGN PATENT DOCUMENTS

| | | |
|---|---|---|
| JP | 7-141577 A | 6/1995 |
| JP | 10-62518 A | 3/1998 |
| WO | 2009/019735 A1 | 2/2009 |

OTHER PUBLICATIONS

Finkenzeller: "RFID Handbook: Fundamentals and Applications in Contactless Smart Cards and Identification", pp. 42-44, 2003.*
Notification of Reasons for Refusal, dated Jun. 24, 2014, issued by the Japanese Patent Office, in counterpart Application No. 2011-006831.

(Continued)

*Primary Examiner* — Firmin Backer
*Assistant Examiner* — Nay Tun
(74) *Attorney, Agent, or Firm* — Sughrue Mion, PLLC

(57) ABSTRACT

Provided is a wireless communication system including a first radio equipment that transmits first data using first radio waves, a data transmitter that outputs a second radio wave generated by modulating the first radio wave according to second data to be transmitted, and a second radio equipment that receives the first radio wave and the second radio wave, and separates and demodulates the first data transmitted from the first radio equipment and the second data transmitted from the data transmitter contained in the received radio waves.

14 Claims, 21 Drawing Sheets

(56) References Cited

U.S. PATENT DOCUMENTS

2007/0018832 A1* 1/2007 Beigel et al. ............... 340/572.7
2007/0176754 A1* 8/2007 Fischer et al. ............. 340/10.34
2009/0015413 A1* 1/2009 Gelabert et al. ........... 340/572.1
2009/0186645 A1* 7/2009 Jaturong et al. ............. 455/507
2010/0240334 A1* 9/2010 Cheng et al. ............... 455/161.3

OTHER PUBLICATIONS

Hiroyuki Nakamoto, et al., "A Passive UHF RFID Tag LSI with 36.6% Efficiency CMOS-Only Rectifier and Current-Mode Demodulator in 0.35μm FeRAM Technology", IEEE International Solid-State Circuits Conference, Digest of Technical Papers, 2006, Session 17, Lecture No. 17.2.

* cited by examiner

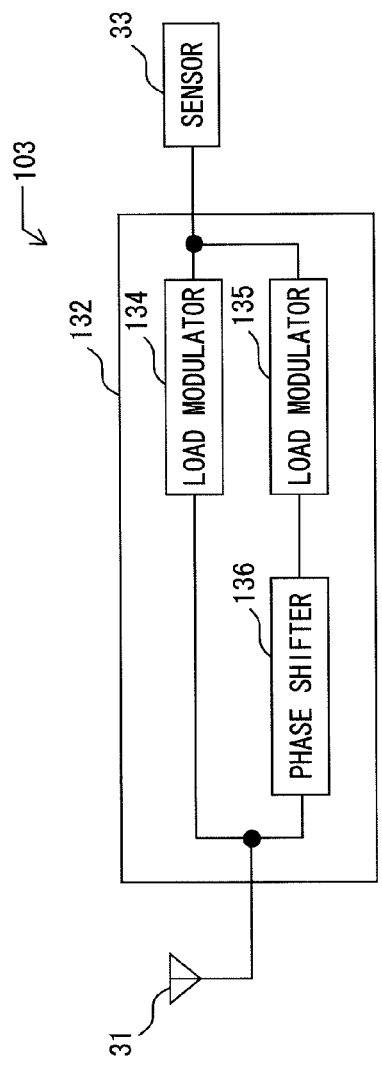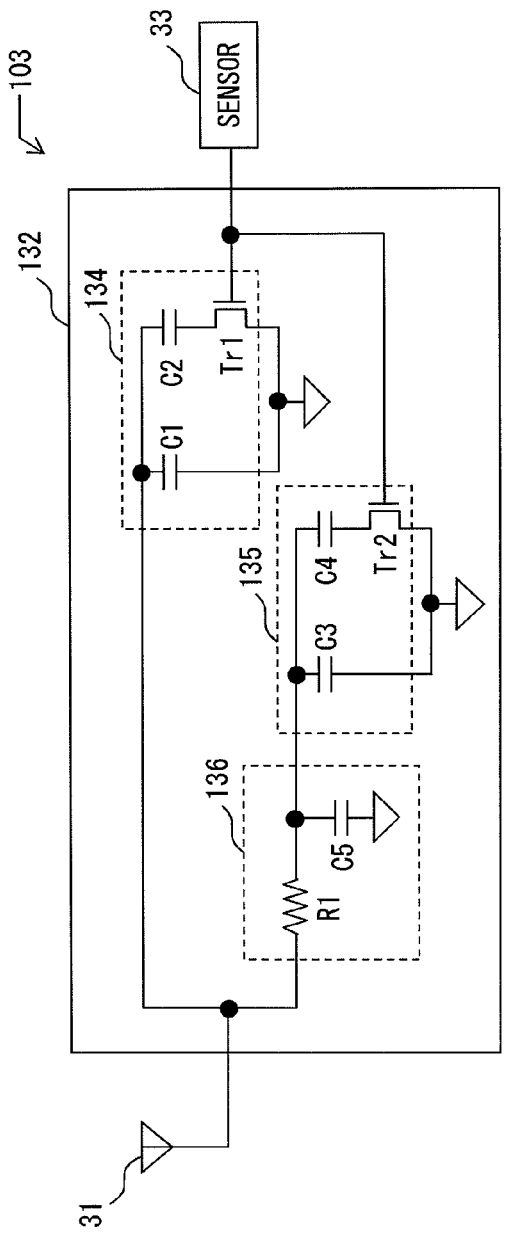
Fig. 16A
Fig. 16B

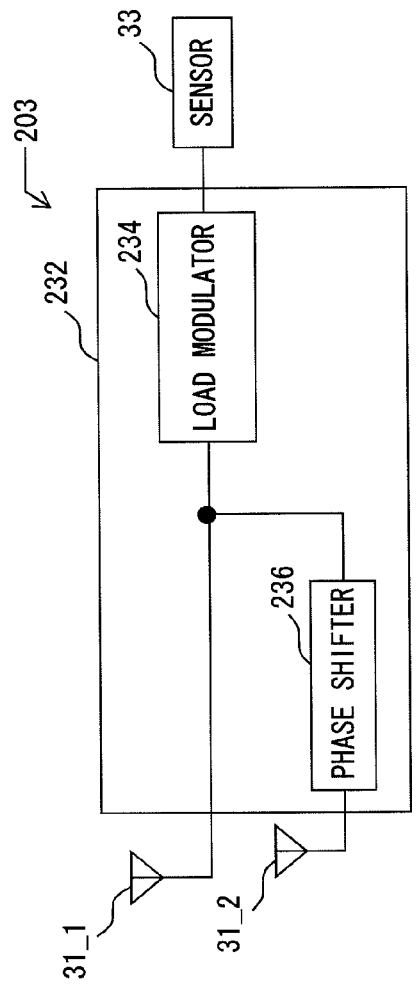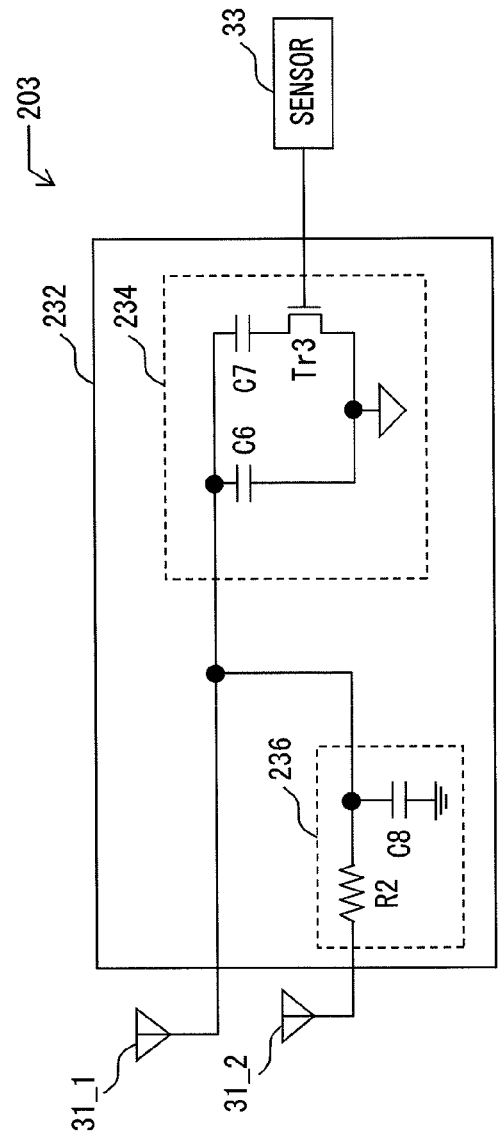
Fig. 18A
Fig. 18B

WIRELESS COMMUNICATION SYSTEM, WIRELESS COMMUNICATION METHOD, RADIO EQUIPMENT, AND DATA TRANSMITTER

CROSS-REFERENCE TO RELATED APPLICATIONS

This application is based upon and claims the benefit of priority from Japanese patent application No. 2010-204307, filed on Sep. 13, 2010, and Japanese patent application No. 2011-006831, filed on Jan. 17, 2011, the disclosures of which are incorporated herein in its entirety by reference.

BACKGROUND

The present invention relates to a wireless communication system and a wireless communication method and, particularly, to a wireless communication system and a wireless communication method that can introduce a system using RFID (Radio Frequency IDentification) technology into the wireless network environment.

A system using RFID attracts attention and has begun to be applied to various uses. The basic configuration of the system using RFID includes an RFID reader/writer that performs data communication with an RFID radio tag via radio and a computer terminal that controls the RFID reader/writer. The RFID reader/writer can read or write data stored in the radio tag (cf. International Solid-State Circuits Conference 2006, Digest of Technical Papers, Lecture No. 17.2).

The RFID radio tag does not have a battery built in because it generates a power supply voltage using a radio wave when transmitting and receiving data to and from the RFID reader/writer. Such a radio tag is generally called "passive". Specifically, in the RFID radio tag, a radio wave (part of a carrier wave) supplied from the RFID reader/writer is rectified from alternating current to direct current by a full-wave rectifier. After that, the voltage is stepped up or down to a suitable voltage as a circuit power supply by an internal voltage control circuit or a booster circuit, and then the power is supplied as a power supply to an internal circuit such as a current mode demodulator or a logic circuit. In this case, the efficiency of the conversion from alternating current to direct current in the RFID radio tag can be enhanced by optimizing the device size of a PMOS/NMOS rectifying diode included in the full-wave rectifier or reducing a loss due to parasitic capacitance or the like before input to the rectifying diode and a loss due to mismatch between an antenna and a rectifying input.

Further, a technique related to an indoor intruder detection apparatus is disclosed in Japanese Unexamined Patent Application Publication No. H07-141577. The indoor intruder detection apparatus disclosed therein includes a transmitting device, a receiving device, and an alarm device. The transmitting device transmits a non-modulated wave signal with a given carrier frequency. The receiving device includes a receiving unit that receives a signal output from the transmitting device, a detecting unit that detects the received signal, and a level variation detection unit that outputs a detection signal when the level of the signal obtained by the detecting exceeds a predetermined range. The alarm device raises an alarm based on the detection signal output from the level variation detection unit of the receiving device. The indoor intruder detection apparatus disclosed in Japanese Unexamined Patent Application Publication No. H07-141577 detects indoor intruder based on the variation of the received electric field of a radio wave output from the transmitting device and the variation of the bit error rate of a demodulated signal.

SUMMARY

As described in the related art, in order to read the data stored in the RFID radio tag (which is also called a data transmitter), a dedicated RFID reader/writer is required. Therefore, in order to read the data stored in the RFID radio tag under the wireless network (WLAN) environment, for example, a dedicated RFID reader/writer that is connected to the wireless network by wire or wireless is required. The present inventors have found a problem that it takes cost to introduce a system using RFID technology under the wireless network environment.

A first aspect of the present invention is a wireless communication system including a first radio equipment that transmits first data using a first radio wave, a data transmitter that outputs a second radio wave generated by modulating the first radio wave according to second data to be transmitted, and a second radio equipment including a separator/demodulator that receives the first radio wave and the second radio wave, and separates and demodulates the first data transmitted from the first radio equipment and the second data transmitted from the data transmitter contained in the received radio waves.

A second aspect of the present invention is a wireless communication method for transmitting second data to a wireless network including a first radio equipment that transmits first data and a second radio equipment that receives the first data by using a data transmitter, the method including transmitting the first data from the first radio equipment using a first radio wave, generating a second radio wave by modulating the first radio wave according to the second data and outputting the second radio wave by the data transmitter, and receiving the first radio wave and the second radio wave, and separating and demodulating the first data transmitted from the first radio equipment and the second data transmitted from the data transmitter contained in the received radio waves by the second radio equipment.

In the wireless communication system and the wireless communication method according to the above aspects of the present invention, the data transmitter modulates the first radio wave according to the second data to be transmitted and outputs the modulated radio wave as the second radio wave. The modulated second radio wave acts as a disturbance for the first radio wave. Then, the second radio equipment separates the first data transmitted from the first radio equipment and the second data transmitted from the data transmitter based on the presence or absence of the disturbance for the first radio wave, and then demodulates the first data and the second data. It is thus not necessary to use a dedicated RFID reader/writer in order to read the data stored in the data transmitter, thereby allowing reduction of the cost when introducing a system using RFID technology under the wireless network environment.

A third aspect of the present invention is a data transmitter including a sensor for acquiring data to be transmitted, and a modulator that modulates a first radio wave used in a wireless network according to the data to be transmitted and thereby generates a second radio wave causing a disturbance on the first radio wave.

A fourth aspect of the present invention is a radio equipment including a separator/demodulator that receives a first radio wave containing first data and a second radio wave generated by modulating the first radio wave according to second data, the second radio wave causing a disturbance on the first radio wave, and separates and demodulates the first data and the second data contained in the received radio waves based on a bit error rate of the first radio wave.

According to the aspects of the invention described above, it is possible to provide a wireless communication system and a wireless communication method that allow reduction of the cost when introducing a system using RFID technology under the wireless network environment.

BRIEF DESCRIPTION OF THE DRAWINGS

The above and other aspects, advantages and features will be more apparent from the following description of certain embodiments taken in conjunction with the accompanying drawings, in which:

FIG. 16A is a block diagram showing details of a data transmitter included in the wireless communication system according to the fifth embodiment;

FIG. 16B is a view showing an example of a specific circuit of the data transmitter shown in FIG. 16A;

FIG. 18A is a block diagram showing a data transmitter included in a wireless communication system according to a sixth embodiment;

FIG. 18B is a view showing an example of a specific circuit of the data transmitter shown in FIG. 18A;

DETAILED DESCRIPTION

First Embodiment

Embodiments of the present invention are described hereinafter with reference to the drawings.

Figure 1:
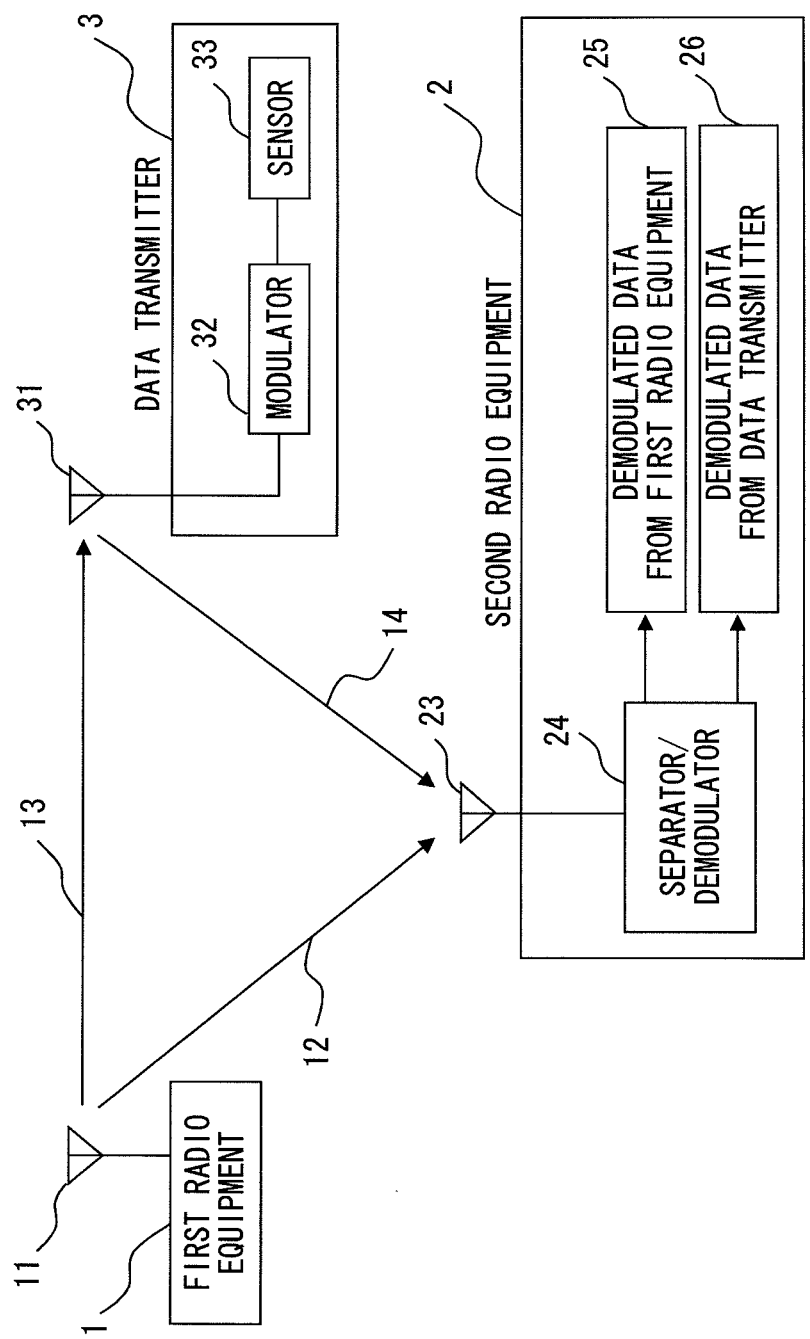
FIG. 1 is a block diagram showing a wireless communication system according to a first embodiment.

FIG. 1 is a block diagram showing a wireless communication system according to a first embodiment. Referring to FIG. 1, the wireless communication system according to the first embodiment includes a first radio equipment 1, a second radio equipment 2, and a data transmitter (which corresponds to an RFID radio tag) 3. The first radio equipment 1 transmits first data using first radio waves 12 and 13. The data transmitter 3 generates a second radio wave 14 by modulating the first radio wave 13 according to second data to be transmitted, and outputs the second radio wave 14. The second radio equipment 2 includes a separator/demodulator 24 that receives the first radio wave 12 and the second radio wave 14, and then separates and demodulates the first data transmitted from the first radio equipment 1 and the second data transmitted from the data transmitter 3 respectively contained in the received radio waves. The feature of the wireless communication system according to this embodiment is that a disturbance from the data transmitter 3 such as RFID, which has been removed as noise in related art, can be separated by the separator/demodulator 24 of the second radio equipment 2 and extracted as data. Hereinafter, each element of the wireless communication system according to this embodiment is described in detail.

The first radio equipment 1 includes an internal circuit (not shown) for achieving radio communication with the second radio equipment 2 and an antenna 11, and transmits the first data using the first radio waves 12 and 13. The first radio wave 12 is a direct wave that is directly transmitted to the second radio equipment 2. On the other hand, the first radio wave 13 is transmitted to the data transmitter 3.

The second radio equipment 2 includes an internal circuit (not shown) for achieving radio communication with the first radio equipment 1, and an antenna 23. Further, the separator/demodulator 24 of the second radio equipment 2 separates the first data transmitted from the first radio equipment 1 and the second data transmitted from the data transmitter 3 respectively contained in the received first and second radio waves. Further, the separator/demodulator 24 demodulates the first data transmitted from the first radio equipment 1 and the second data transmitted from the data transmitter 3.

The first radio equipment 1 and the second radio equipment 2 constitute a wireless network (WLAN), and the first radio equipment 1 may be a WLAN base station (WLAN master unit), and the second radio equipment 2 may be a WLAN receiver (WLAN slave unit), for example. Further, the first radio equipment 1 and the second radio equipment 2 are configured to be able to perform two-way communication, for example. Note that, in this embodiment, normal data communication between the first radio equipment 1 and the second radio equipment 2 is performed by using the internal circuits respectively included in the first radio equipment 1 and the second radio equipment 2. The normal data communication between the first radio equipment 1 and the second radio equipment 2 is performed in the same manner as in related art, and thus not described in detail here.

Further, the wireless communication system according to this embodiment is not limited to WLAN and widely applicable to Bluetooth (registered trademark), the existing wireless standards for cellular phones and the like.

The data transmitter 3 includes an antenna 31, a modulator 32, and a sensor 33. The data transmitter 3 receives the first radio wave 13 that is output from the first radio equipment 1 using the antenna 31, generates the second radio wave 14 by modulating the first radio wave 13 according to the second data to be transmitted using the modulator 32, and then outputs the second radio wave 14. The second data transmitted from the data transmitter 3 is data that have been collected using the sensor 33, for example. The sensor 33 may be a temperature sensor that measures the body temperature of a person, a pressure sensor that measures the blood pressure of a person and the like, for example. For example, the temperature of an object to be measured can be checked sequentially by attaching the data transmitter with a built-in temperature sensor to the object to be measured, wirelessly transmitting the temperature information of the object to be measured, and receiving the temperature information by a wireless network.

Note that the sensor 33 is not limited to the temperature sensor or the pressure sensor, and any sensor may be used as long as it can acquire prescribed data. Further, the second data that is transmitted from the data transmitter 3 may be data prestored in the data transmitter 3 and, in this case, the sensor 33 may be eliminated from the data transmitter 3.

The modulator 32 can generate the second radio wave 14 by load modulation of the first radio wave 13 according to the second data to be transmitted, for example. Further, the data transmitter 3 may include a power generator 34 as shown in another example of the wireless communication system according to this embodiment in FIG. 3. Specifically, the power generator 34 that is included in a data transmitter 30 shown in FIG. 3 receives a first radio wave (environmental radio wave) 13 using an antenna 31, and rectifies the first radio wave (environmental radio wave) 13 from alternating current to direct current by a full-wave rectifier. Then, the power generator 34 steps up or down the voltage to a suitable voltage level as a circuit power supply using an internal voltage control circuit or a booster circuit, and then supplies the power to the modulator 32, the sensor 33 and the like. In this case, the data transmitter 30 does not need to have a battery built in, thus being a so-called passive data transmitter. On the other hand, the data transmitter 3 may have a battery built in, and, in this case, it is a so-called active data transmitter. Note that, when it is an active type, a remaining amount of the battery may be contained in the second data that is transmitted from the data transmitter 3.

Next, the operation of the wireless communication system according to this embodiment is described.

The first radio equipment 1 and the second radio equipment 2 constitute a wireless network (WLAN). The first radio equipment 1 and the second radio equipment 2 are configured to be able to perform communication using the first radio wave 12 having a modulation element in compliance with the specifications.

Figure 2:
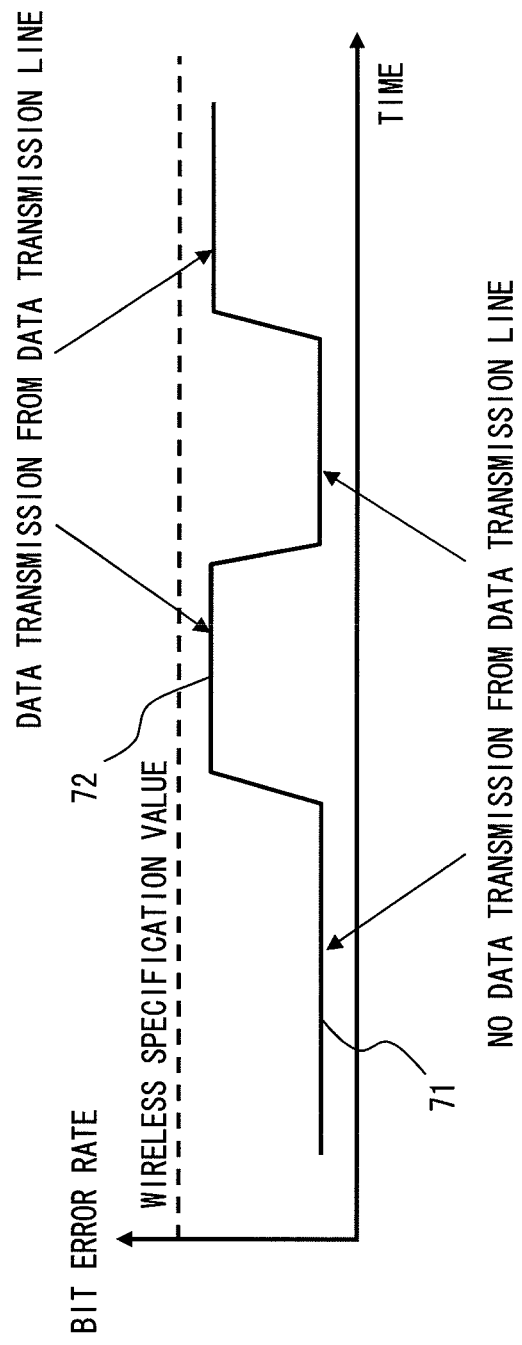
FIG. 2 is a view illustrating a bit error rate of a radio wave received by a second radio equipment according to the first embodiment.

FIG. 2 is a view illustrating a bit error rate of radio waves (the first radio wave 12 and the second radio wave 14) received by the second radio equipment 2. When there is no data transmission from the data transmitter 3, the first radio wave 12 is not affected by the second radio wave 14 transmitted from the data transmitter 3. Thus, in this case, the second radio wave 14 transmitted from the data transmitter 3 does not act as a disturbance for the first radio wave 12, and therefore the bit error rate does not increase as shown in FIG. 2. Thus, the first radio equipment 1 and the second radio equipment 2 can communicate with a low bit error rate 71 shown in FIG. 2. Then, the second radio equipment 2 receives the first radio wave 12 by the antenna 23, and the separator/demodulator 24 demodulates the first data transmitted from the first radio equipment 1.

Next, the case where the data transmitter 3 transmits data is described. In this case, the data transmitter 3 first receives the first radio wave 13 that is output from the first radio equipment 1. Further, the sensor 33 outputs the data acquired in the sensor 33 to the modulator 32. Then, the modulator 32 performs load modulation of the received first radio wave 13 according to the data acquired in the sensor 33 (the second data to be transmitted), and outputs the modulated radio wave as the second radio wave 14 (this operation is also called reflection).

In the case where the data transmitter 3 transmits data, the first radio wave 12 is affected by the second radio wave 14 transmitted from the data transmitter 3 as shown in FIG. 2. Thus, in this case, the second radio wave 14 transmitted from the data transmitter 3 acts as a disturbance for the first radio wave 12, and therefore the bit error rate increases as indicated by the reference numeral 72 in FIG. 2.

Stated differently, because the second radio wave modulated by load modulation in the data transmitter 3 disturbs the radio wave transmitted from the first radio equipment 1 and reduces the reception SN ratio, so that the bit error rate increases. Specifically, if load modulation for on-off-keying is effected in the data transmitter 3, the second data can be transmitted using the time variation of the bit error rate as shown in FIG. 2. The time variation of the bit error rate is then detected in the second radio equipment 2, and the second data transmitted from the data transmitter 3 can be thereby demodulated.

Note that the bit error rate 72 at this time is within a range lower than a wireless specification value for the bit error rate so as not to cause adverse effects on the communication between the first radio equipment 1 and the second radio equipment 2. In other words, the bit error rate 71 and the bit error rate 72 are both within a range lower than the wireless specification value for the bit error rate. Because the communication environment varies all the time and various disturbances (reflection waves) are present, the wireless standards are developed to ensure the robustness of communication against such disturbances.

The second radio equipment 2 receives the first radio wave 12 and the second radio wave 14 by the antenna 23. Then, the separator/demodulator 24 separates the first data transmitted from the first radio equipment 1 and the second data transmitted from the data transmitter 3 respectively contained in the received radio waves and then demodulates the those data to generate demodulated data 25 from the first radio equipment 1 and demodulated data 26 from the data transmitter 3.

Note that the first data transmitted from the first radio equipment 1 is transmitted using the first radio wave 12 having a modulation element in compliance with the specifications of the first radio equipment 1 and the second radio equipment 2 (i.e., the radio wave having a carrier frequency in compliance with the specifications). On the other hand, the second data transmitted from the data transmitter 3 is transmitted using a variation in the bit error rate (i.e., the rise and fall of the bit error rate) in the radio waves (the first and second radio waves) received by the second radio equipment 2.

At this time, the period of a variation in the bit error rate (i.e., the modulation cycle of the bit error rate) of the radio wave received by the second radio equipment 2 is slower than the modulation cycle of the first radio wave 12 having a carrier frequency in compliance with the specifications. Therefore, the first data transmitted from the first radio equipment 1 and the second data transmitted from the data transmitter 3 can be separated using the separator/demodulator 24.

For example, the separator/demodulator 24 may include a low-pass filter (LPF) and separate the second data with a slow modulation cycle of the bit error rate using the low-pass filter (LPF). Further, the separator/demodulator 24 may include a band-pass filter (BPF), for example, and separate the second data with a slow modulation cycle of the bit error rate using the band-pass filter (BPF). The band-pass filter (BPF) may be formed by combining a low-pass filter (LPF) and a high-pass filter (HPF). By use of the high-pass filter (HPF), the modulation component of the environmental radio wave whose modulation cycle is lower than the modulation cycle of the second data can be removed from the second data.

Note that the separator/demodulator 24 may be a filter circuit for analog signals or a filter circuit for digital signals after AD conversion.

Figure 3:
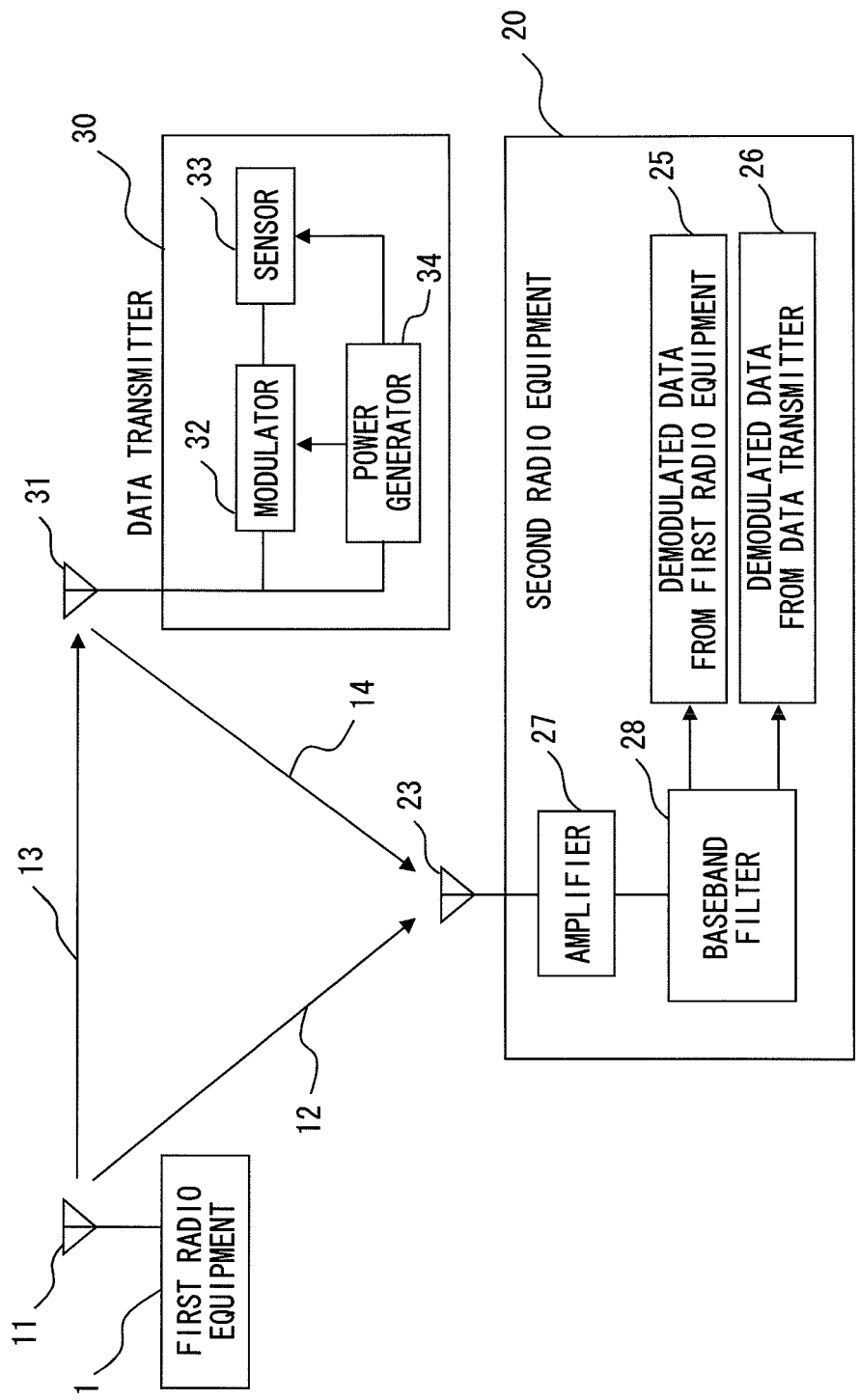
FIG. 3 is a block diagram showing another example of the wireless communication system according to the first embodiment.

FIG. 3 is a block diagram showing another example of the wireless communication system according to this embodiment. As shown in FIG. 3, the first radio wave 12 and the second radio wave 14 that are received by the antenna 23 of the second radio equipment 2 may be amplified by an amplifier 27. Further, as shown in FIG. 3, a baseband filter 28 may be used as the separator/demodulator 24. Furthermore, a filter may be added as appropriate according to the surrounding radio conditions, and filtering may be performed with a strong frequency band of the second radio wave 14. By the amplifier 27 and the filtering, the signal amplitude can be increased to such a level that separation and demodulation can be performed in the separator/demodulator 24 (the baseband filter 28) in the subsequent stage.

Figure 4:
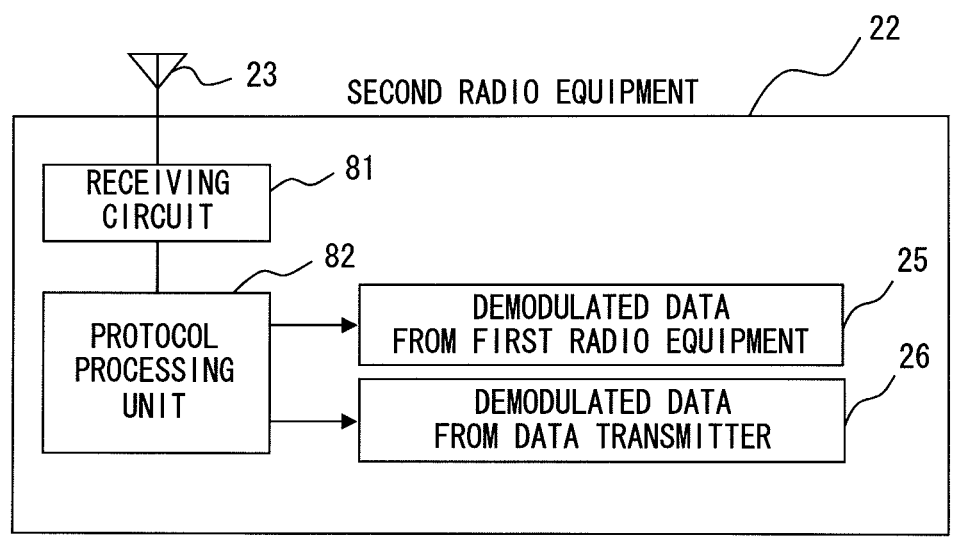
FIG. 4 is a block diagram showing another example of the second radio equipment included in the wireless communication system according to the first embodiment.

Further, the separator/demodulator 24 included in the second radio equipment 2 shown in FIG. 1 may be configured as follows. FIG. 4 is a diagram showing a configuration of a second radio equipment 22 in the wireless communication system according to this embodiment. The second radio equipment 22 shown in FIG. 4 includes an antenna 23, a receiving circuit 81, and a protocol processing unit 82, which are the same as in the existing radio equipment. Then, software processing is done on the protocol processing unit 82 of the second radio equipment 22 so that the protocol processing unit 82 operates as the above-described separator/demodulator 24. By conducting software processing on the protocol processing unit 82, the second radio equipment 2 shown in FIG. 1 can be configured using the existing radio equipment. Note that, in this embodiment, a part of the protocol processing unit shown in FIG. 4 may be configured by hardware and, in this case, the second radio equipment 2 can be configured by conducting software processing on a part of the protocol processing unit different from the part configured by hardware.

Thus, the first data transmitted from the first radio equipment 1 is transmitted using the first radio wave 12 having a modulation element in compliance with the specifications of the first radio equipment 1 and the second radio equipment 2 (i.e., the radio wave having a carrier frequency in compliance with the specifications). On the other hand, the second data transmitted from the data transmitter 3 is transmitted using a variation in the bit error rate (i.e., the rise and fall of the bit error rate) in the radio waves (the first and second radio waves) received by the second radio equipment 2. Then, software processing is performed on the protocol processing unit 82 so as to separate and demodulate the first data transmitted from the first radio equipment 1 (i.e., the data transmitted with a carrier frequency in compliance with the specifications) and the second data transmitted from the data transmitter 3 (i.e., the data transmitted using the bit error rate modulated with a predetermined modulation frequency), and thereby the demodulated data 25 from the first radio equipment 1 and the demodulated data 26 from the data transmitter 3 can be obtained. Such processing in the protocol processing unit 82 is carried out in the baseband domain.

As described in the related art, in order to read the data stored in the RFID radio tag (the data transmitter) under the wireless network environment, a dedicated RFID reader/writer connected with the wireless network by wire or wireless has been required. This raises a problem that it takes cost to introduce a system using RFID technology under the wireless network environment.

However, in the wireless communication system according to this embodiment, under the wireless network environment composed of the first radio equipment 1 and the second radio equipment 2, the data transmitter 3 generates and outputs the second radio wave 14 by modulating the first radio wave 13 according to the second data to be transmitted. The modulated second radio wave 14 acts as a disturbance for the first radio wave 12. Then, the separator/demodulator 24 of the second radio equipment 2 separates the first data transmitted from the first radio equipment 1 and the second data transmitted from the data transmitter 3 based on the presence or absence of the disturbance for the first radio wave 12, and then demodulates the first data and the second data.

In the wireless communication system according to this embodiment having the above-described configuration, it is not necessary to use a dedicated RFID reader/writer in order to read the data stored in the RFID radio tag (the data transmitter). It is thereby possible to provide the wireless communication system that allows reduction of the cost when introducing a system using RFID technology under the wireless network environment.

Further, in the wireless communication system according to this embodiment, the second radio equipment can be configured by conducting software processing on the protocol processing unit 82 of the second radio equipment 22 having the existing hardware configuration shown in FIG. 4 so as to operate as the separator/demodulator 24 shown in FIG. 1. Because the second radio equipment according to this embodiment can be configured simply by installing software into the existing hardware configuration, it is possible to reduce the cost when introducing a system using RFID technology under the wireless network environment.

Further, in the passive data transmitter 3 that generates a power supply voltage using a radio wave, during feeding from the dedicated RFID reader/writer to the data transmitter 3, radio waved that do not propagate toward the data transmitter 3 exist. Specifically, when the antenna of the RFID reader/writer does not have directivity, power that does not propagate toward the data transmitter 3 and goes to waste exist. Further, even when the power transfer efficiency is enhanced by adding the directivity to the antenna of the RFID reader/writer, there is a power that is wastefully dissipated in the space as long as electric power is transmitted via radio waves.

On the other hand, in the wireless communication system according to this embodiment shown in FIG. 3, the power generator 34 of the data transmitter 30 generates a power using radio waves (environmental radio waves) that are used for communication of the first radio equipment 1 and the second radio equipment 2. There is thus no need to use an additional RFID reader/writer to output radio waves for power supply, and it is thereby possible to reduce the power consumption of the wireless communication system.

Further, the technique disclosed in Japanese Unexamined Patent Application Publication No. H07-141577 merely detects the presence or absence of a disturbance and fails to discriminate a disturbance that varies with time from data and to differentiate a non-desired disturbance source and a desired disturbance. As a result, in such a wireless communication system, various disturbances (reflection waves) are present due to variations in the communication environment, and the bit error rate varies accordingly. In the technique disclosed in Japanese Unexamined Patent Application Publication No. H07-141577, the presence or absence of variations in a disturbance is merely detected based on the bit error rate, and a desired disturbance is not extracted as significant data.

On the other hand, in the wireless communication system according to this embodiment, the second data with a slow modulation cycle of the bit error rate (the data transmitted from the data transmitter) is separated using the separator/demodulator, and the second data is then demodulated.

It is thereby possible to achieve acquisition of communication data from a desired disturbance, noise removal that is essential to establish the wireless data communication, and selection of the other end of communication in one-to-many communication (see the fourth example below for detail), which have not been achieved in the technique disclosed in Japanese Unexamined Patent Application Publication No. H07-141577.

Further, a wireless communication method according to this embodiment is a wireless communication method for transmitting the second data to the wireless network including the first radio equipment 1 that transmits the first data and the second radio equipment 2 that receives the first data, using the data transmitter 3, and the method includes: (1) a step of transmitting the first data from the first radio equipment 1 using the first radio waves 12 and 13, (2) a step of generating the second radio wave 14 by modulating the first radio wave 13 according to the second data and outputting the second radio wave 14 by the data transmitter 3, and (3) a step of receiving the first radio wave 12 and the second radio wave 14, and then separating and demodulating the first data transmitted from the first radio equipment 1 and the second data transmitted from the data transmitter 3 contained in the received radio waves by the second radio equipment 2.

According to the embodiment of the invention described above, it is possible to provide a wireless communication system and a wireless communication method that allow reduction of the cost when introducing a system using RFID technology under the wireless network environment.

Second Embodiment

Figure 5:
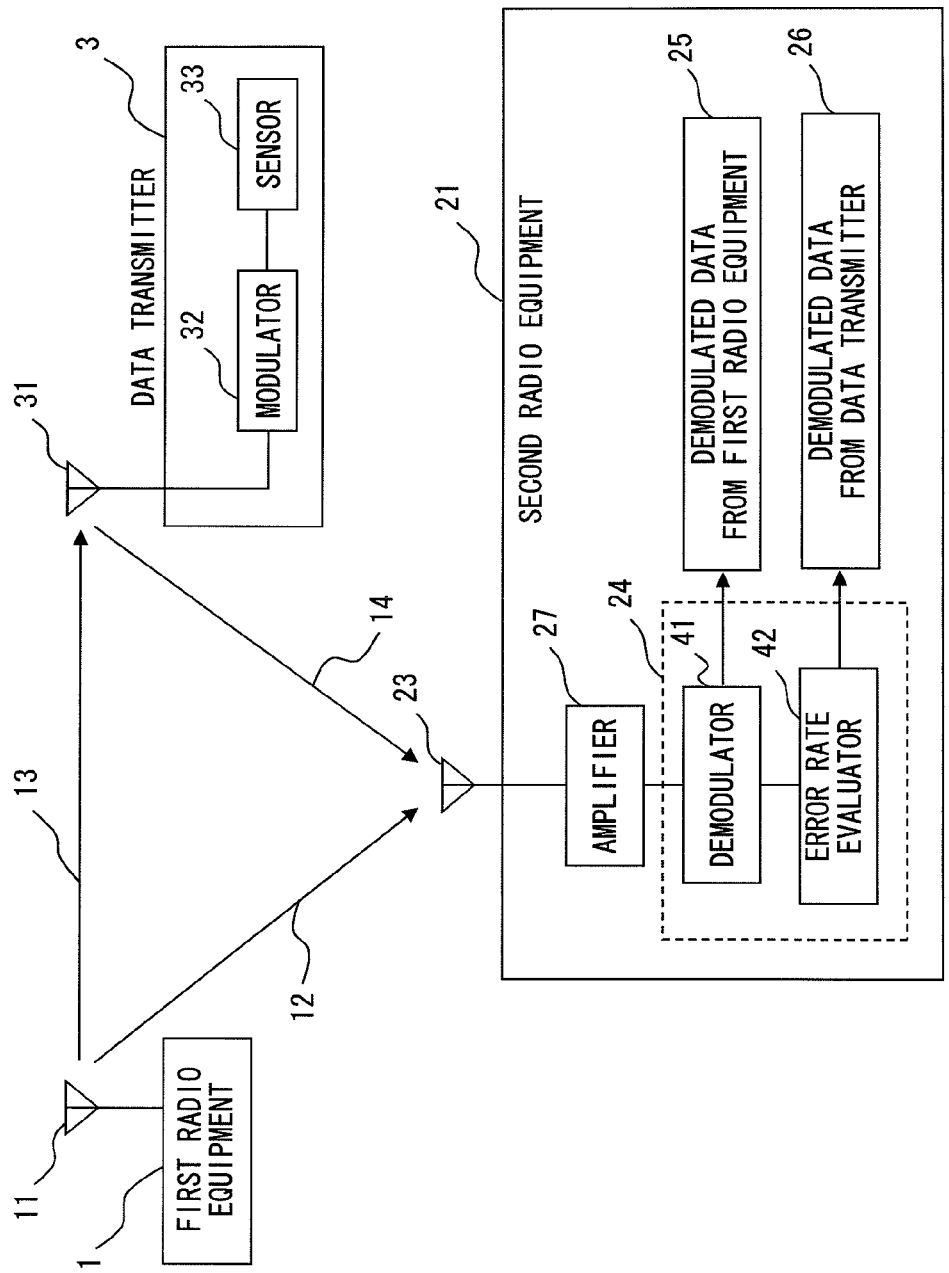
FIG. 5 is a block diagram showing a wireless communication system according to a second embodiment.

A second embodiment of the present invention is described hereinbelow. FIG. 5 is a block diagram showing a wireless communication system according to the second embodiment. The wireless communication system according to this embodiment is different from the wireless communication system according to the first embodiment illustrated in FIG. 1 in that a second radio equipment 21 includes a demodulator 41 and an error rate evaluator 42 as the separator/demodulator 24. This embodiment is the same as the first embodiment except for this point, and therefore the same elements are denoted by the same reference numerals and not redundantly described.

Referring to FIG. 5, the second radio equipment 21 of the wireless communication system according to this embodiment includes the amplifier 27, the demodulator 41 and the error rate evaluator 42. Note that the amplifier 27 may be eliminated as appropriate when the signal levels of the first radio wave 12 and the second radio wave 14 are so high that can be processed in the separator/demodulator 24 in the subsequent stage.

The demodulator 41 demodulates the first data transmitted from the first radio equipment 1 contained in the received radio wave and outputs the demodulated data as the demodulated data 25 from the first radio equipment 1. The error rate evaluator 42 evaluates the bit error rate after the first data transmitted from the first radio equipment 1 is demodulated, reads and demodulates the data transmitted from the data transmitter 3 based on the time variation of the bit error rate, and thereby generates the demodulated data 26 from the data transmitter 3. In the wireless communication system according to this embodiment, a circuit that performs demodulation is only the demodulator 41 that demodulates the first data transmitted from the first radio equipment 1, and the data transmitted from the data transmitter 3 is demodulated in baseband processing in the subsequent stage.

When a disturbance from the third party is further present in the wireless communication system having the above-described configuration, or when the first radio wave (direct wave) 12 from the first radio equipment 1 is dominant over the second radio wave 14 from the data transmitter 3, for example, the reception SN ratio of the second data from the data transmitter 3 decreases. In this case, the reception SN ratio of the second data from the data transmitter 3 can be increased by performing majority decision or code spreading, thereby enabling the second radio equipment 21 to receive the second data from the data transmitter 3.

It is assumed, for example, that the first radio equipment 1, the second radio equipment 21 and the data transmitter 3 are arranged in an isosceles triangle where the distance between the first radio equipment 1 and the second radio equipment 21 and the distance between the first radio equipment 1 and the data transmitter 3 are equal, and the distance between the second radio equipment 21 and the data transmitter 3 is half those distances, and, the coefficient of reflection for reflecting radio waves from the first radio equipment 1 is approximately 0.5 in the data transmitter 3. In such a case, the distance from the first radio equipment 1 to the second radio equipment 21 indirectly via the data transmitter 3 is 1.5 times the distance from the first radio equipment 1 directly to the second radio equipment 21, and, assuming that an arrival power is proportional to the inverse of the square of the distance, a distance attenuation of $10*\log(1/(1.5*1.5))=-4$ dB is applied to the indirect wave compared with the direct wave. Further, because the coefficient of reflection is 0.5, a return loss of $10*\log(0.5)=-3$ dB is applied. Accordingly, the ratio of a power N exerted by the radio wave from the first radio equipment 1 that enters the second radio equipment 21 as noise and a power S exerted by the radio wave from the first radio equipment 1 that enters the second radio equipment 21 as data via the data transmitter 3 is S/N=−3 dB−4 dB=−7 dB assuming that the attenuation of a signal component=distance attenuation+return loss and that the noise power does not increase or decrease, thus being buried in noise.

Figure 8:
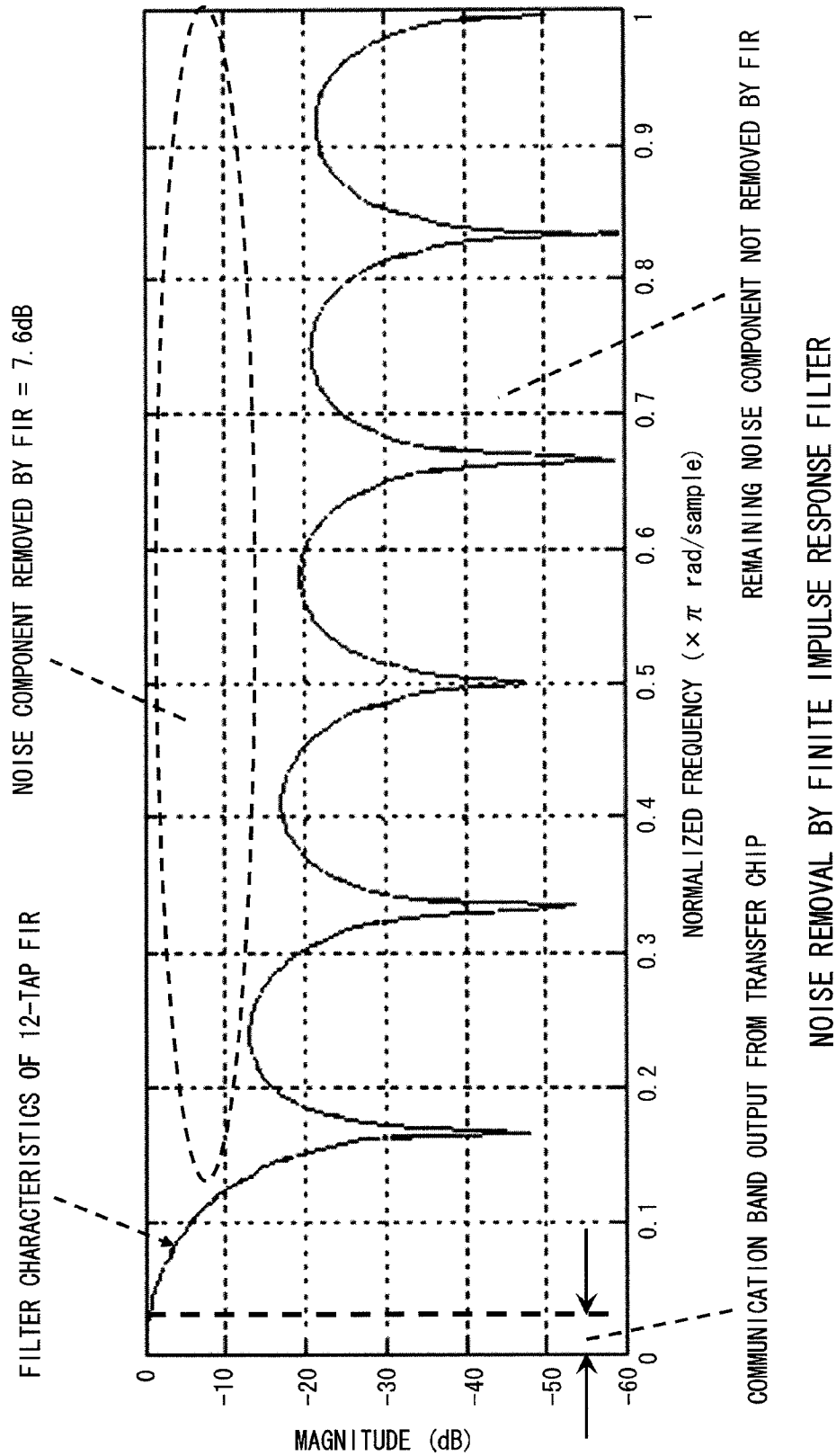
FIG. 8 is a view illustrating noise removal by a finite impulse response filter.

However, when the same data is transmitted twelve times, for example, from the data transmitter 3, and majority decision is performed in the second radio equipment 2 to reduce random noise, a 12-tap finite impulse response filter S/N which is defined by $$H(z^{-1})=1+z^{-1}+z^{-2}+\ldots+z^{-11}$$

is improved by 7.6 dB as shown in FIG. 8, and data of S/N=−7 dB can be received as a result.

Figure 9:
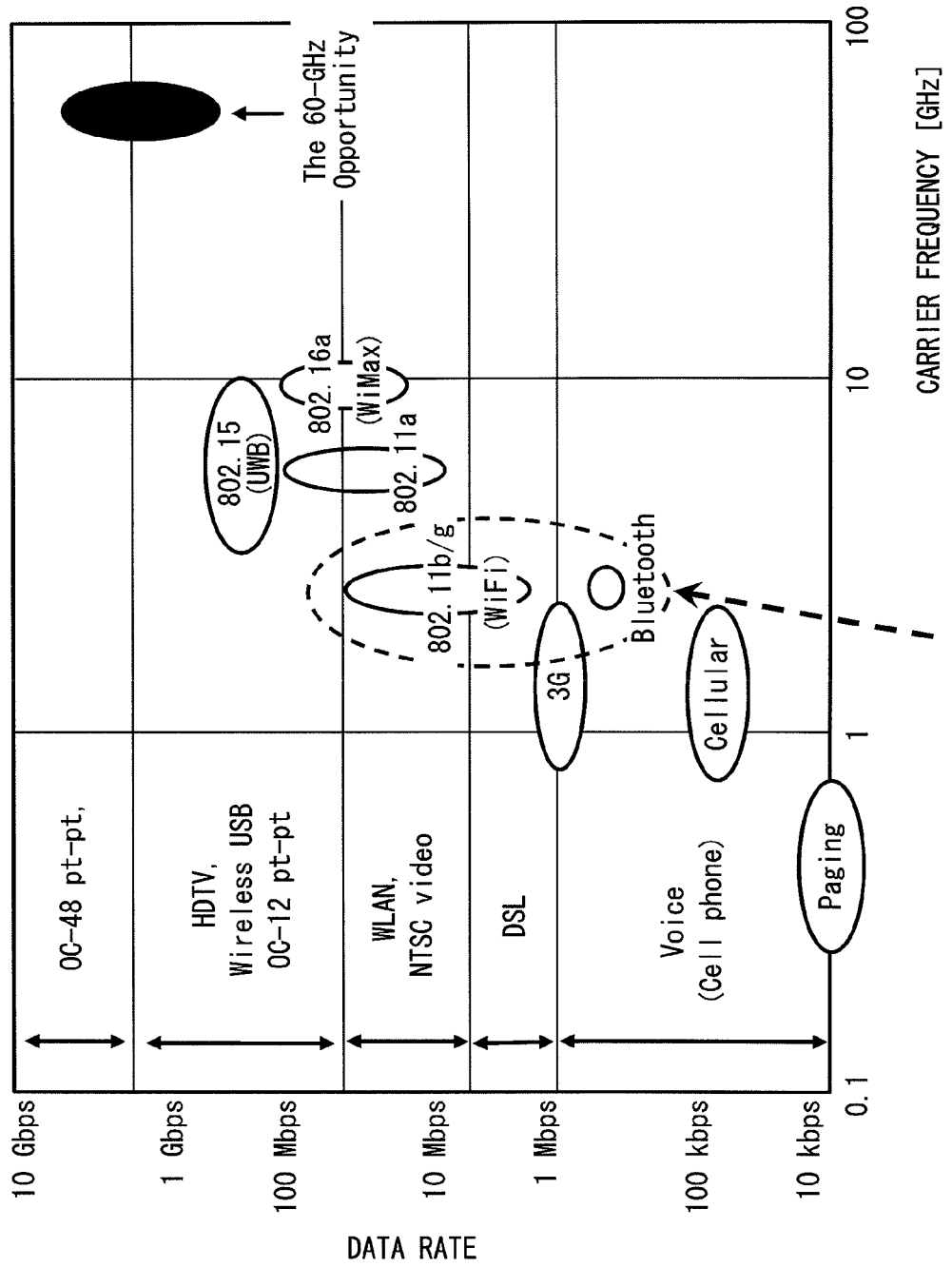
FIG. 9 is a view showing a relationship between a carrier frequency and a data rate in the wireless communication system.

As shown in FIG. 9, a data rate is 1 Mbps at the lowest in the 2.4 GHz frequency band of a WLAN carrier wave. Thus, because the environmental radio wave does not have a periodicity at a low frequency with a data rate lower than 1 Mbps, it spreads sufficiently in white in the communication band of the data transmitter 3. Thus, the SN ratio can be improved by performing majority decision. Note that because majority decision and code spreading require redundancy, the effective data communication rate decreases. In this case, the scale of available data is smaller than that of the existing RFID system.

Figure 6:
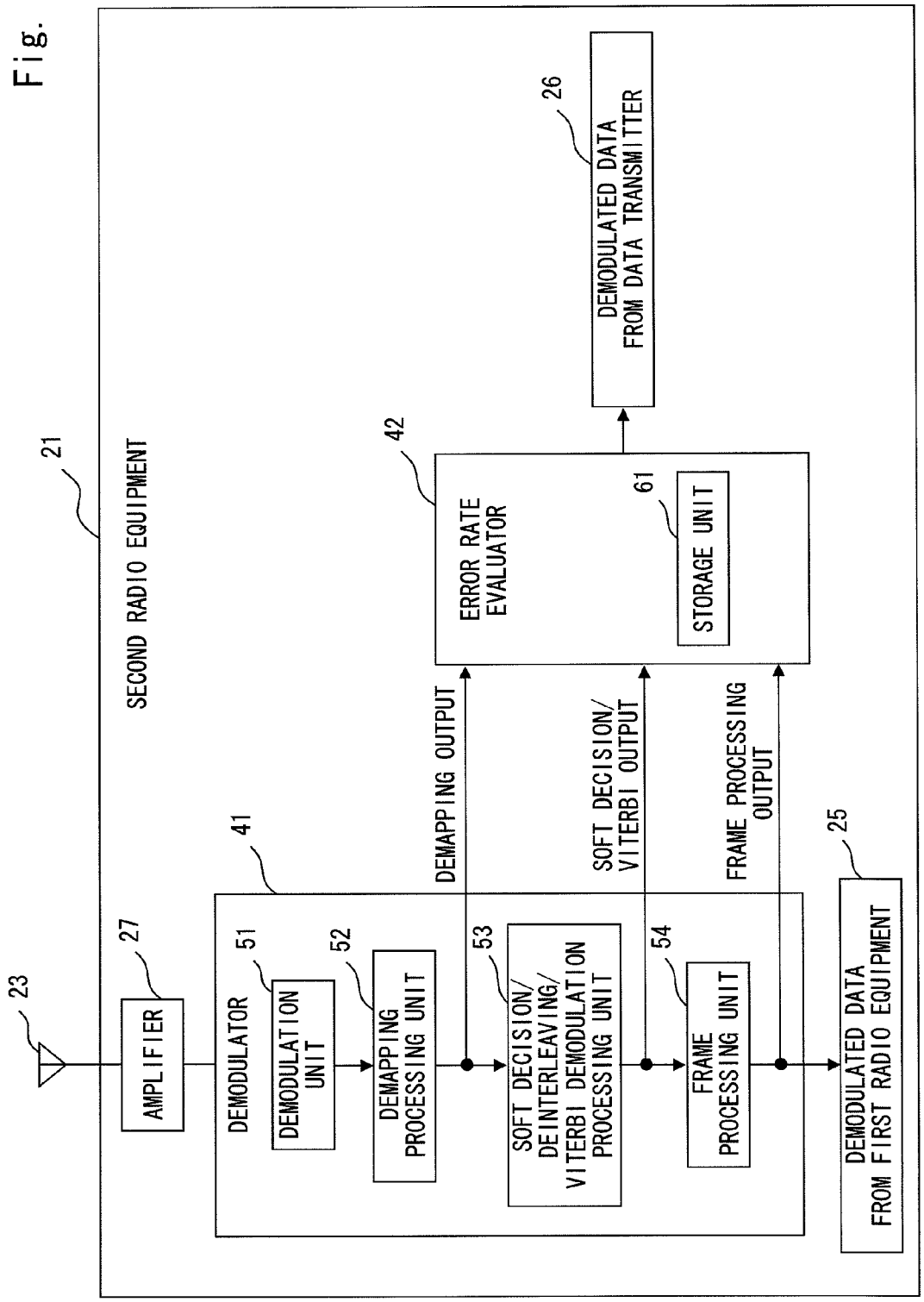
FIG. 6 is a block diagram showing a second radio equipment included in the wireless communication system according to the second embodiment.

Next, the second radio equipment 21 that is used in the wireless communication system according to this embodiment is described specifically with reference to FIG. 6. The demodulator 41 of the second radio equipment 21 shown in FIG. 6 includes a demodulation unit 51, a demapping processing unit 52, a soft decision/deinterleaving/Viterbi demodulation processing unit 53, and a frame processing unit 54.

Demapping output from the demapping processing unit 52 is output to the soft decision/deinterleaving/Viterbi demodulation processing unit 53 and the error rate evaluator 42. Soft decision and Viterbi output from the soft decision/deinterleaving/Viterbi demodulation processing unit 53 is output to the frame processing unit 54 and the error rate evaluator 42. Frame processing output from the frame processing unit 54 is output as the demodulated data 25 from the first radio equipment 1. Further, frame processing output from the frame processing unit 54 is output also to the error rate evaluator 42.

The error rate evaluator 42 includes a storage unit 61. The error rate evaluator 42 demodulates the second data transmitted from the data transmitter 3 based on at least one of the demapping output, the soft decision and Viterbi output and the frame processing output, and outputs the demodulated data 26 from the data transmitter 3.

Figure 7:
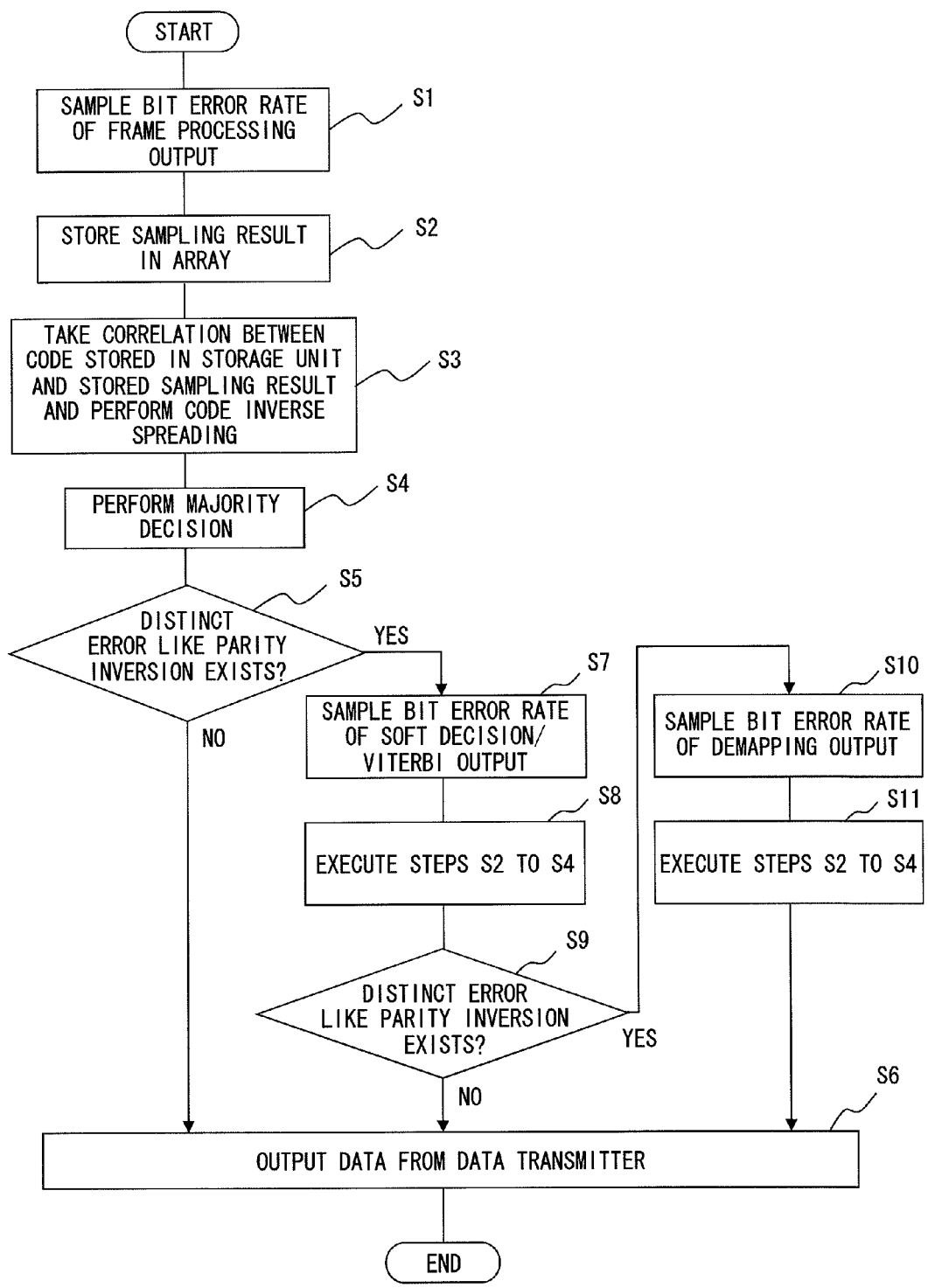
FIG. 7 is a flowchart illustrating an operation of the wireless communication system according to the second embodiment.

FIG. 7 is a flowchart illustrating the operation of the second radio equipment 21 shown in FIG. 6.

First, the first data transmitted from the first radio equipment 1 is demodulated by the demodulation unit 51. The demodulated data demodulated by the demodulation unit 51 branches from each layer of protocol processing, like a bit string after demapping, a bit string after soft decision and Viterbi processing, and a bit string after frame processing, and then output from the demodulator 41. As protocol processing in the demapping processing unit 52, the soft decision/deinterleaving/Viterbi demodulation processing unit 53 and the frame processing unit 54 proceeds, the effects of disturbances such as disturbance waves are reduced. Therefore, the bit string after demapping is more largely affected by disturbances than the bit string after frame processing.

Next, sampling is conducted on the bit error rate of the frame processing output (Step S1). In this step, the bit error rate is sampled at a rate higher than the symbol rate of data transmitted from the data transmitter 3. Then, the obtained sampling result is stored in an array into the storage unit (Step S2).

Then, code inverse spreading is performed on the array obtained in Steps S1 and S2 to improve the SN ratio (Step S3). In this step, code inverse spreading is performed by taking a correlation between the spread code previously stored in the second radio equipment 21 and the stored sampling result, and a bit string obtained as a result is further stored into the storage unit.

Further, because the same data is repeatedly transmitted from the data transmitter 3, majority decision is performed among them, and the result is stored into the storage unit (Step S4).

Next, it is determined whether there is a distinct error such as parity bit inversion in the result obtained after the majority decision (Step S5). When it is determined that there is no distinct error in Step S5, the obtained result is output as the data (second data) transmitted from the data transmitter 3 (Step S6). On the other hand, when it is determined that there is a distinct error in Step S5, it is considered to be under the transfer environment where the data from the data transmitter 3 is likely to be buried in noise.

In such a case, sampling is conducted on the bit error rate of the soft decision and Viterbi output which is more largely affected by disturbances (Step S7). Then, the same processing as the above-described processing from Step S2 to Step S4 is performed on the sampling result of the bit error rate of the soft decision and Viterbi output (Step S8). Further, it is determined whether there is a distinct error such as parity bit inversion in the result after the majority decision (Step S9). When it is determined that there is no distinct error in Step S9, the obtained result is output as the data (second data) transmitted from the data transmitter 3 (Step S6).

On the other hand, when it is determined that there is a distinct error in Step S9, sampling is conducted on the bit error rate of the demapping output which is more largely affected by disturbances (Step S10). Then, the same processing as the above-described processing from Step S2 to Step S4 is performed on the sampling result of the bit error rate of the demapping output (Step S11). Then, the obtained result is output as the data (second data) transmitted from the data transmitter 3 (Step S6).

As the target of sampling changes from the bit error rate of the frame processing output, the bit error rate of the soft decision and Viterbi output and to the bit error rate of the demapping output, it becomes more subject to noise. In this case, the effect of noise can be reduced by increasing the length of the spread code or increasing the number of times of sampling in the majority decision.

Note that, when use is limited to the environment with low noise such as the environment in which the distance between the data transmitter 3 and the second radio equipment 2 is short, the second radio equipment 21 does not need to have a complicated configuration as described above, and it can demodulate the second data transmitted from the data transmitter 3 by tracing the bit error rate after frame processing only.

In the wireless communication system according to this embodiment also, it is possible to provide the wireless communication system that allows reduction of the cost when introducing a system using RFID technology under the wireless network environment.

Note that the second radio equipment 21 in the wireless communication system according to this embodiment can be also configured by conducting software processing on the existing radio equipment. Specifically, because processing after the demapping in the second radio equipment 21 is protocol processing, the second radio equipment 21 shown in FIG. 6 can be configured by conducting software processing on the protocol processing unit shown in FIG. 4, for example. Note that, in this embodiment, a part of the protocol processing unit shown in FIG. 4 may be configured by hardware and, in this case, the second radio equipment 21 can be configured by conducting software processing on a part of the protocol processing unit different from the part configured by hardware.

Third Embodiment

A third embodiment of the present invention is described hereinbelow. In the wireless communication system according to this embodiment, processing in the second radio equipment 21 shown in FIG. 6 is different from the processing according to the second embodiment. This embodiment is the same as the second embodiment except for this point, and therefore the same elements are denoted by the same reference numerals and not redundantly described.

Figure 10:
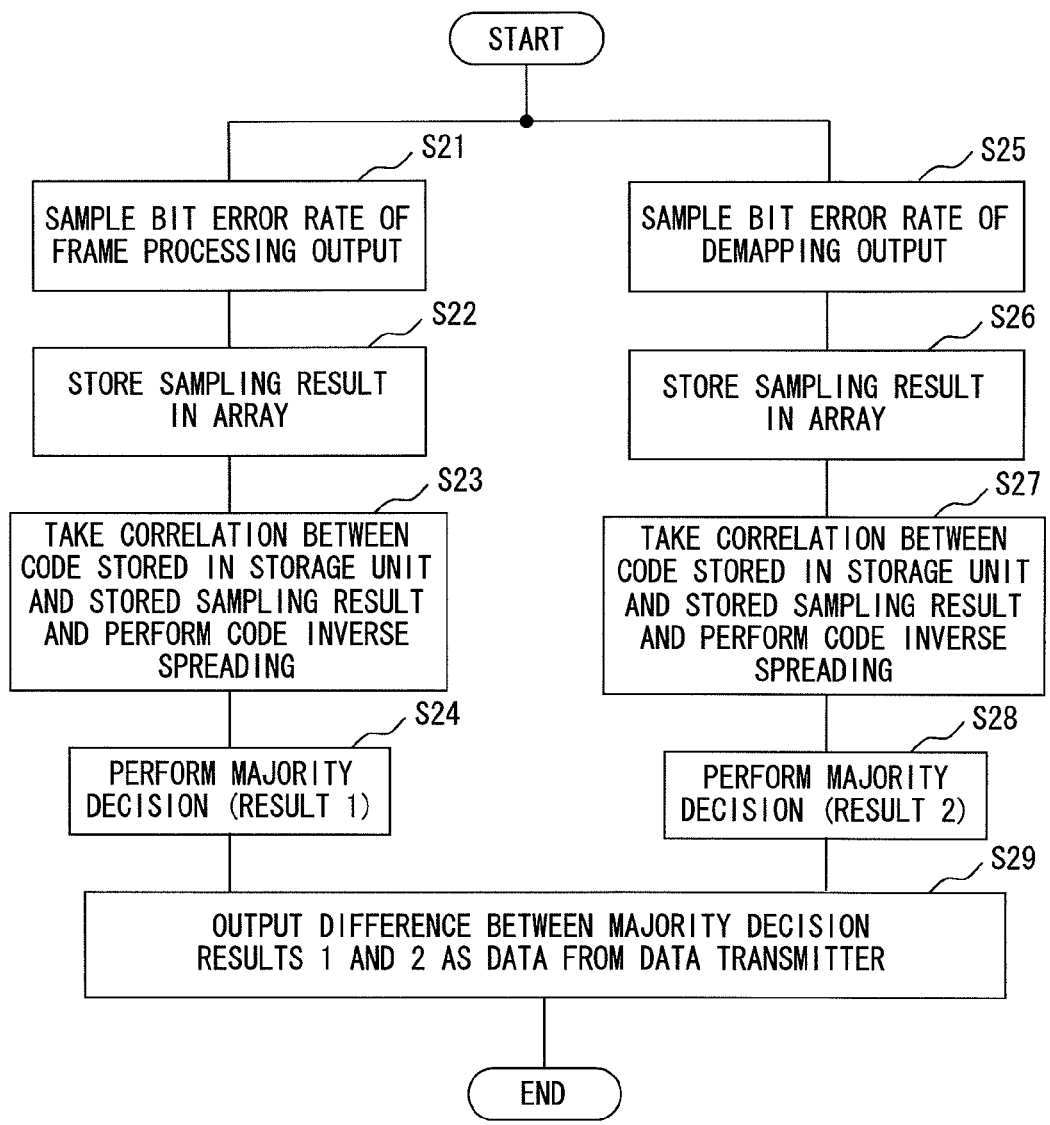
FIG. 10 is a flowchart illustrating an operation of a wireless communication system according to a third embodiment.

FIG. 10 is a flowchart illustrating processing of the second radio equipment 21 according to this embodiment. The flow of FIG. 10 is different from the flow of FIG. 7 described in the second embodiment in that determination using a parity bit (Steps S5 and S9) illustrated in FIG. 7 is eliminated in the flow of FIG. 10.

Specifically, in the flow of FIG. 10, sampling is first conducted on the bit error rate of the frame processing output (Step S21). Then, the obtained sampling result is stored in an array into the storage unit (Step S22).

Next, code inverse spreading is performed on the array obtained in Steps S21 and S22 to thereby improve the SN ratio (Step S23). In this step, code inverse spreading is performed by taking a correlation between the spread code previously stored in the second radio equipment 21 and the stored sampling result, and a bit string obtained as a result is further stored into the storage unit. Then, majority decision is performed using the data repeatedly transmitted from the data transmitter 3, and a result (result 1) is stored into the storage unit (Step S24).

Further, the following processing is performed in parallel with the processing from S21 to S24 described above.

First, sampling is conducted on the bit error rate of the demapping output (Step S25). Then, the obtained result is stored in an array into the storage unit (Step S26).

Then, code inverse spreading is performed on the array obtained in Steps S25 and S26 to thereby improve the SN ratio (Step S27). In this step, code inverse spreading is performed by taking a correlation between the spread code previously stored in the second radio equipment 21 and the stored sampling result, and a bit string obtained as a result is further stored into the storage unit. Then, majority decision is performed using the data repeatedly transmitted from the data transmitter 3, and a result (result 2) is stored into the storage unit (Step S28).

Finally, a difference between the majority decision result 1 and the majority decision result 2 is output as the data (the second data) transmitted from the data transmitter 3 (Step S29).

In this manner, by taking a difference between the frame processing output, which is less affected by disturbances than the demapping output, and the demapping output, the data transmitted as a disturbance from the data transmitter 3 can be extracted. Further, in the wireless communication system according to this embodiment, the processing of the second radio equipment 21 can be performed more easily compared with the processing according to the second embodiment.

Fourth Embodiment

A fourth embodiment of the present invention is described hereinbelow. The wireless communication system according to this embodiment is different from the wireless communication systems described in the first to third embodiments in including a plurality of data transmitters 3_1 to 3_N. This embodiment is the same as the first to third embodiments except for this point, and therefore the same elements are denoted by the same reference numerals and not redundantly described.

Figure 11A:
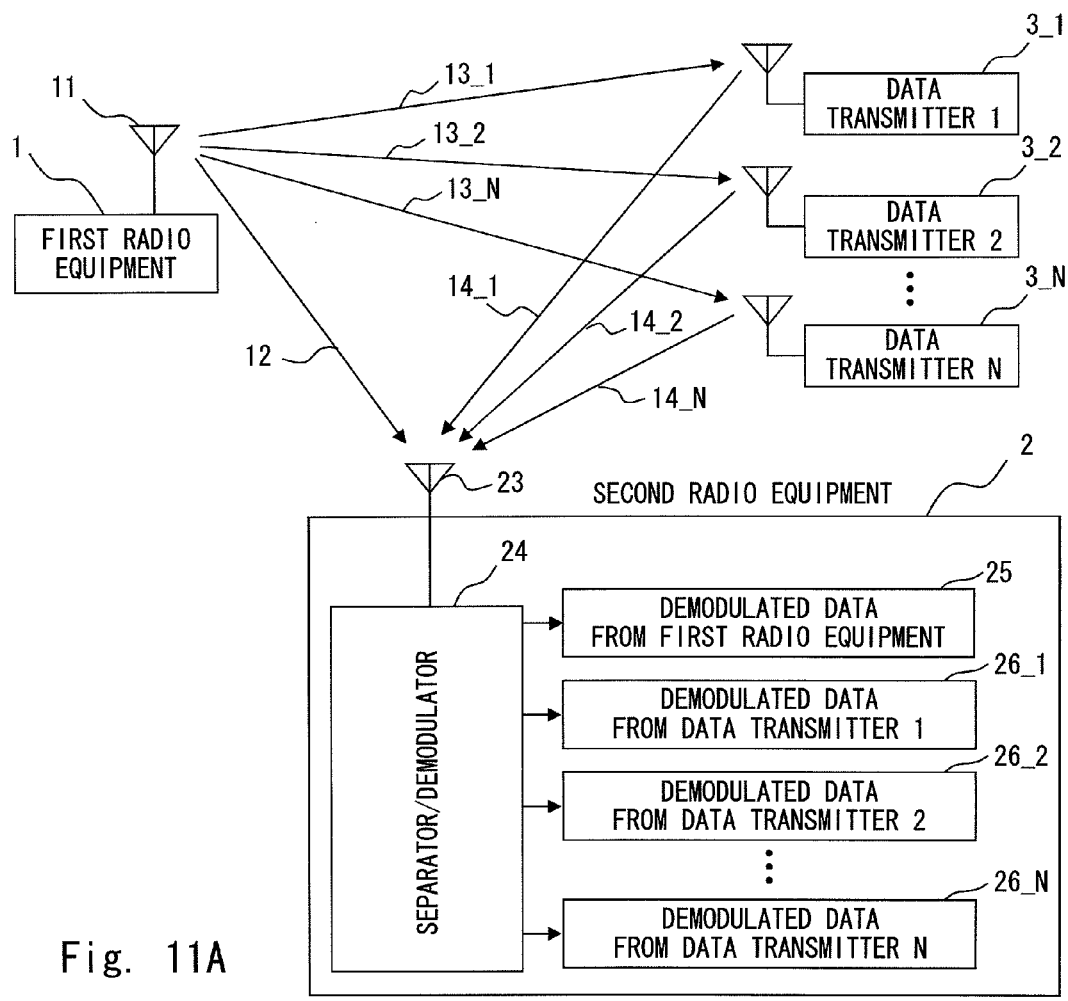
FIG. 11A is a block diagram showing a wireless communication system according to a fourth embodiment.

FIG. 11A is a block diagram showing the wireless communication system according to this embodiment. As shown in FIG. 11A, the wireless communication system according to this embodiment includes a plurality of data transmitters 3_1 to 3_N within a range where the first radio wave that is output from the first radio equipment 1 can be received. The data transmitter 3_1 receives a first radio wave 13_1 that is output from the first radio equipment 1, modulates the first radio wave 13_1 according to the second data to be transmitted, and outputs a second radio wave 14_1. Likewise, the data transmitter 3_2 receives a first radio wave 13_2 that is output from the first radio equipment 1, modulates the first radio wave 13_2 according to the second data to be transmitted, and outputs a second radio wave 14_2. Likewise, the data transmitter 3_N receives a first radio wave 13_N that is output from the first radio equipment 1, modulates the first radio wave 13_N according to the second data to be transmitted, and outputs a second radio wave 14_N.

Figure 11B:
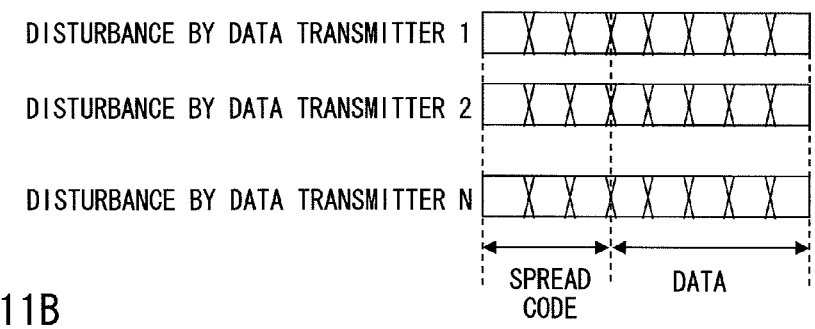
FIG. 11B is a view showing an example of a disturbance caused on a first radio wave by each of a plurality of data transmitters.

FIG. 11B is a view showing an example of disturbances caused on the first radio waves 13_1 to 13_N by the plurality of data transmitters 3_1 to 3_N, respectively. As shown in FIG. 11B, each of the plurality of data transmitters 3_1 to 3_N adds identification information such as a spread code as a header to data to be transmitted.

The second radio equipment 2 receives the first radio wave 12 and the second radio waves 14_1 to 14_N, and then separates and demodulates the first data transmitted from the first radio equipment 1 and the data transmitted from the data transmitters 3_1 to 3_N respectively contained in the received radio waves, using the separator/demodulator 24. The separator/demodulator 24 can distinguish among the data transmitted from the data transmitters 3_1 to 3_N based on the identification information added as a header to the data to be transmitted. The data separated and demodulated by the separator/demodulator 24 are output as demodulated data 25 from the first radio equipment 1 and demodulated data 26_1 to 26_N from the data transmitters 3_1 to 3_N.

Note that although the spread code is used as the identification information in the above example, the identification information may be any information as long as it can distinguish among the data. Further, an M-sequence, for example, may be used as the spread code. However, it is not particularly limited to the M-sequence as long as it is a pseudo-random number having high autocorrelation properties, and a GOLD code may be used, for example. Further, although the case where code inverse spreading is performed is described in the second and third embodiments, spreading for data identification is necessary prior to the code inverse spreading in this case.

Figure 12:
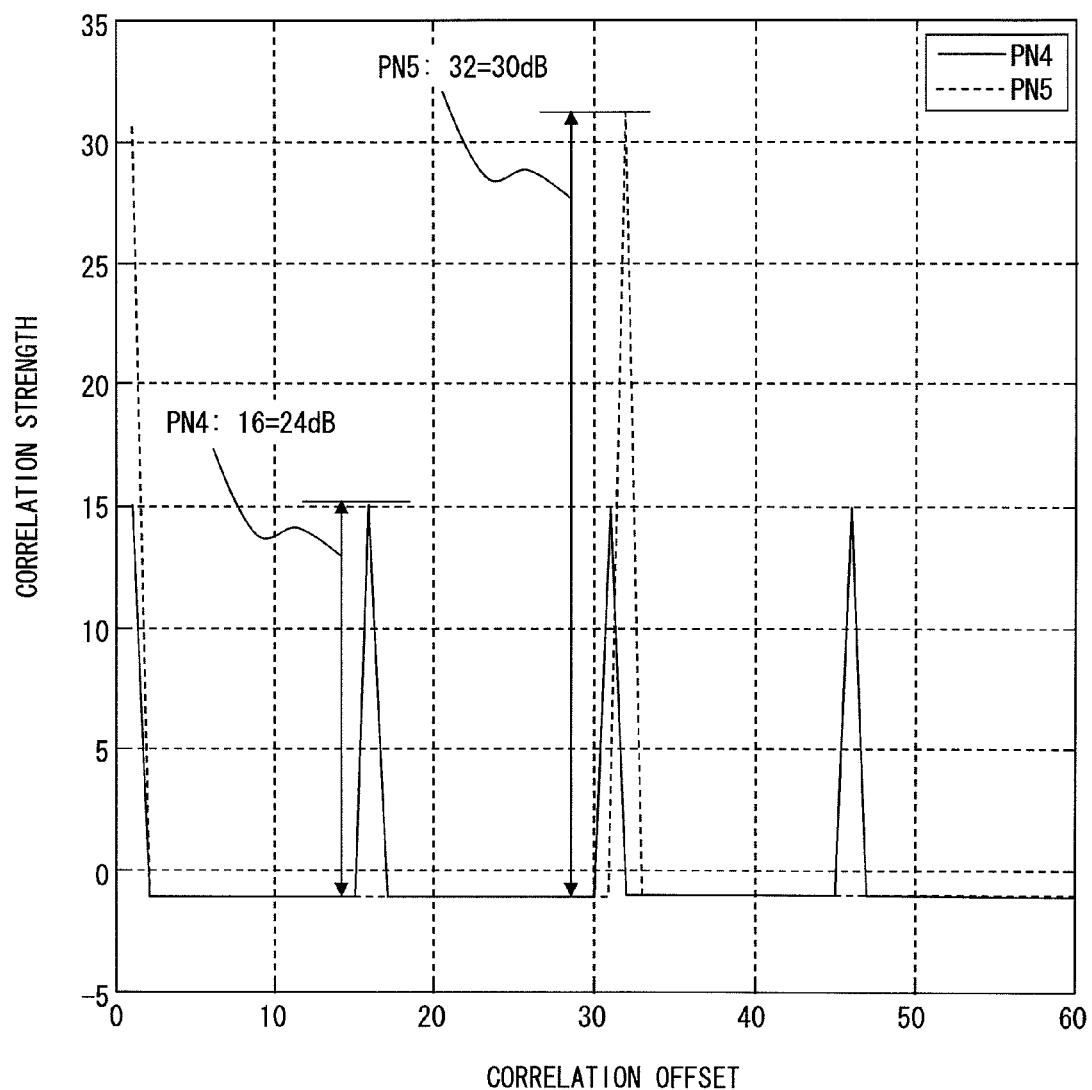
FIG. 12 is a view showing a signal-to-noise (SN) ratio when using an M-sequence PN code.

For example, in the case of using a pseudo-random pattern, which is a code sequence with a low autocorrelation, as the spread code, if PN4, one pair of pseudo-random sequences is used by an initial value allowed for the M-sequence. On the other hand, if PN5 and PN7, the number of pairs of pseudo-random sequences increases like three pairs and nine pairs, respectively. Further, as shown in FIG. 12, when autocorrelations of PN4 and PN5 are calculated, a difference between the peak and the bottom of the correlation strength is 16 and 32, respectively, which are 24 dB and 30 dB. It is thereby possible to distinguish among the data having different spread codes with higher accuracy than the SN ratio required for demodulation of on-off-keying with a bit error rate $>10^{-2}$.

If PN5 is used as the header, and synchronization between a desired data transmitter and the second radio equipment 2 is achieved by applying a matched filter at the beginning of data reception, only the data from one desired data transmitter can be selectively received even when three wireless chip sets exist in the second radio equipment 2. When there are four or more data transmitters, data from each data transmitter can be selectively received by using the spread code of PN7 or above.

In this wireless communication system, even when a plurality of data transmitters 3_1 to 3_N exist, it is possible to selectively receive each data transmitted from each data transmitter, avoiding crosstalk.

Fifth Embodiment

Figure 13:
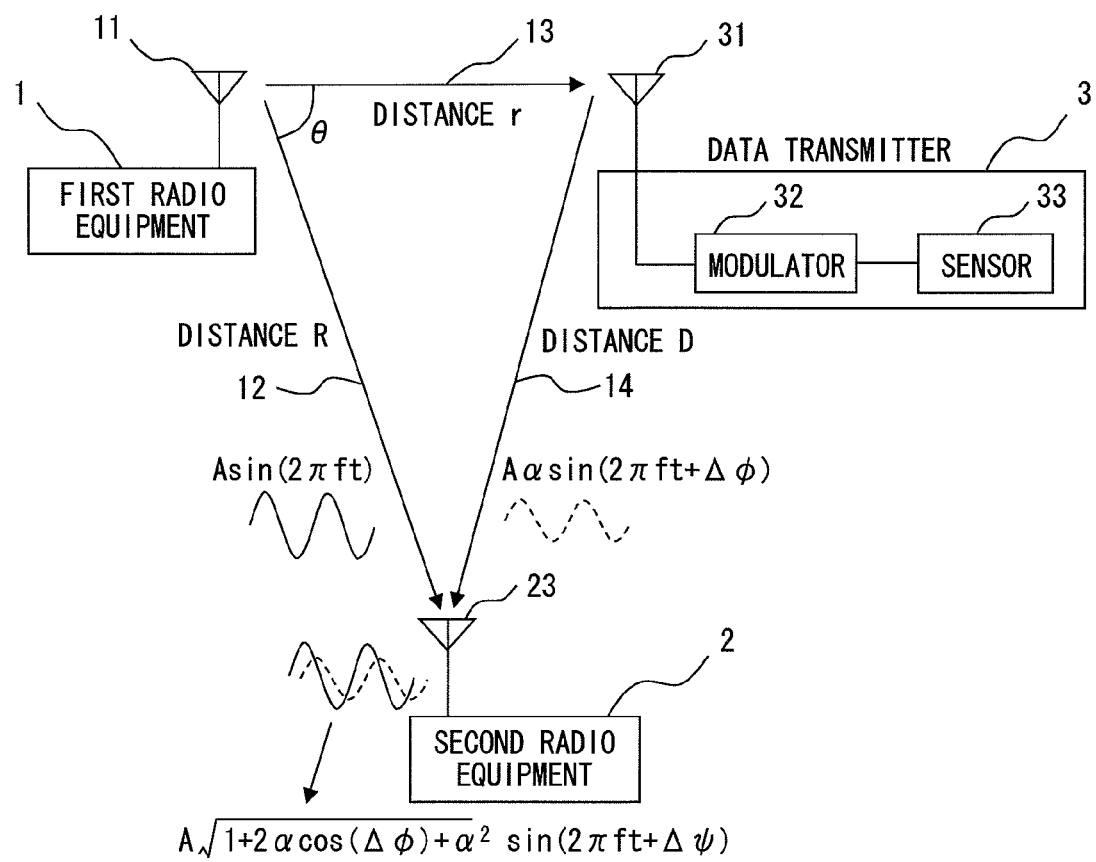
FIG. 13 is a view illustrating a problem in the wireless communication system according to the first embodiment.

A fifth embodiment of the present invention is described hereinbelow. FIG. 13 is a view illustrating a problem that occurs when the communication distance increases in the wireless communication system according to the first embodiment. As shown in FIG. 13, the waveform of the first radio wave 12 when reaching the second radio equipment 2 is represented by a simple sine wave A sin($2\pi ft$), where A is the amplitude, f is the frequency of a signal output from the first radio equipment 1 (the wavelength is c/f when the speed of light is c), and t is time.

Further, the distance between the first radio equipment 1 and the second radio equipment 2 is R, the distance between the first radio equipment 1 and the data transmitter 3 is r, and the distance between the data transmitter 3 and the second radio equipment 2 is D, the path of the radio wave which is via the data transmitter 3 is longer than the path of the first radio wave 12 by r+D−R. Therefore, the waveform of the second radio wave 14, which is a reflected wave of the first radio wave 13 reflected by the data transmitter 3, when entering the second radio equipment 2 is represented by A$\alpha$ sin($2\pi ft+\Delta\phi$) because the amplitude is attenuated by $\alpha$(<1) and the phase is delayed by $\Delta\phi$.

Accordingly, the signal received by the second radio equipment 2 is a signal generated by adding the first radio wave 12 and the second radio wave 14, which can be represented by the following equation.

$$A\sin(2\pi ft)+A\alpha\sin(2\pi ft+\Delta\phi)=A\sqrt{1+2\alpha\cos(\Delta\phi)+\alpha^2}\sin(2\pi ft+\Psi) \quad \text{Equation 1}$$

where $\Psi$ is a constant that is produced by the addition, which is not used in the following discussion.

From the equation 1, if the factor $(1+2\alpha\cos(\Delta\phi)+\alpha^2)^{1/2}$ is more than 1, the close phases overlap with each other. In this state, when the first radio wave 12 and the second radio wave 14 are received by the second radio equipment 2, the first radio wave 12 and the second radio wave 14 intensify each other, and the reception SN ratio increases. Therefore, the bit error rate of the first data transmitted from the first radio equipment 1 decreases.

Further, when the factor $(1+2\alpha\cos(\Delta\phi)+\alpha^2)^{1/2}$ is less than 1, the distant phases interfere with each other. In this state, when the first radio wave 12 and the second radio wave 14 are received by the second radio equipment 2, the first radio wave 12 and the second radio wave 14 weaken each other. Therefore, the bit error rate of the first data transmitted from the first radio equipment 1 increases.

On the other hand, when the factor $(1+2\alpha\cos(\Delta\phi)+\alpha^2)^{1/2}$ is equal to 1, there is no change in the amplitude, Therefore, even though the first radio wave 13 is reflected by the data transmitter 3, there is no variation in the amplitude and the bit error rate, only that there is a change in the phase. Hence, when the condition of the following equation 2 where the factor $(1+2\alpha\cos(\Delta\phi)+\alpha^2)^{1/2}$ is satisfied, no variation occurs in the bit error rate, and data cannot be transmitted using the data transmitter 3 described in the first embodiment.

$$\cos(\Delta\phi)=-\frac{\alpha}{2} \quad \text{Equation 2}$$

When the distance r becomes longer, there is a case where the above-described equation 2 is satisfied depending on the condition of $\Delta\phi$ as described in detail below.

Because $\alpha$ included in the above equations 1 and 2 is a voltage amplitude ratio of the first radio wave 12 and the second radio wave 14, it can be represented by the following equation 3, using power strengths Pr and Pr' of the first radio wave 12 and the second radio wave 14.

$$\alpha=\sqrt{\frac{Pr'}{Pr}} \quad \text{Equation 3}$$

When a power at the front of the antenna which is generated by the first radio equipment 1 is Pt, and antenna gains of the first radio equipment 1 and the second radio equipment 2 are Gt and Gr, respectively, the power strength Pr of the first radio wave 12 is represented as the following equation 4 from Friis' transmission formula.

$$Pr=PtGtGr\left(\frac{c}{4\pi Rf}\right)^2 \quad \text{Equation 4}$$

Further, when the reflection gain when the data transmitter 3 reflects the first radio wave 13 and outputs the second radio wave 14 is G, the power strength Pr' of the second radio wave 14 is represented as the following equation 5, like the above equation 4. Note that G contains the antenna gain in the data transmitter 3, not only a circuit loss at the reflection.

$$Pr'=PtGtGrG\left(\frac{c}{4\pi rf}\right)^2\left(\frac{c}{4\pi Df}\right)^2 \quad \text{Equation 5}$$

From the above equations 3, 4 and 5, the following equation 6 can be obtained.

$$\alpha=\frac{R\sqrt{G}}{rD}\frac{c}{4\pi f} \quad \text{Equation 6}$$

The equation 6 shows that the value of $\alpha$ is decided by the distances R, r and D, the reflection gain G, and the frequency f regardless of the antenna gains of the first radio equipment 1 and the second radio equipment 2.

Further, the phase difference $\Delta\phi$ at the frequency f included in the above equations 1 and 2 can be represented as follows because the path of the radio wave which is via the data transmitter 3 is longer than the path of the first radio wave 12 by r+D−R.

$$\Delta\phi = 2\pi f\left(\frac{r+D-R}{c}\right) \quad \text{Equation 7}$$

Figure 14:
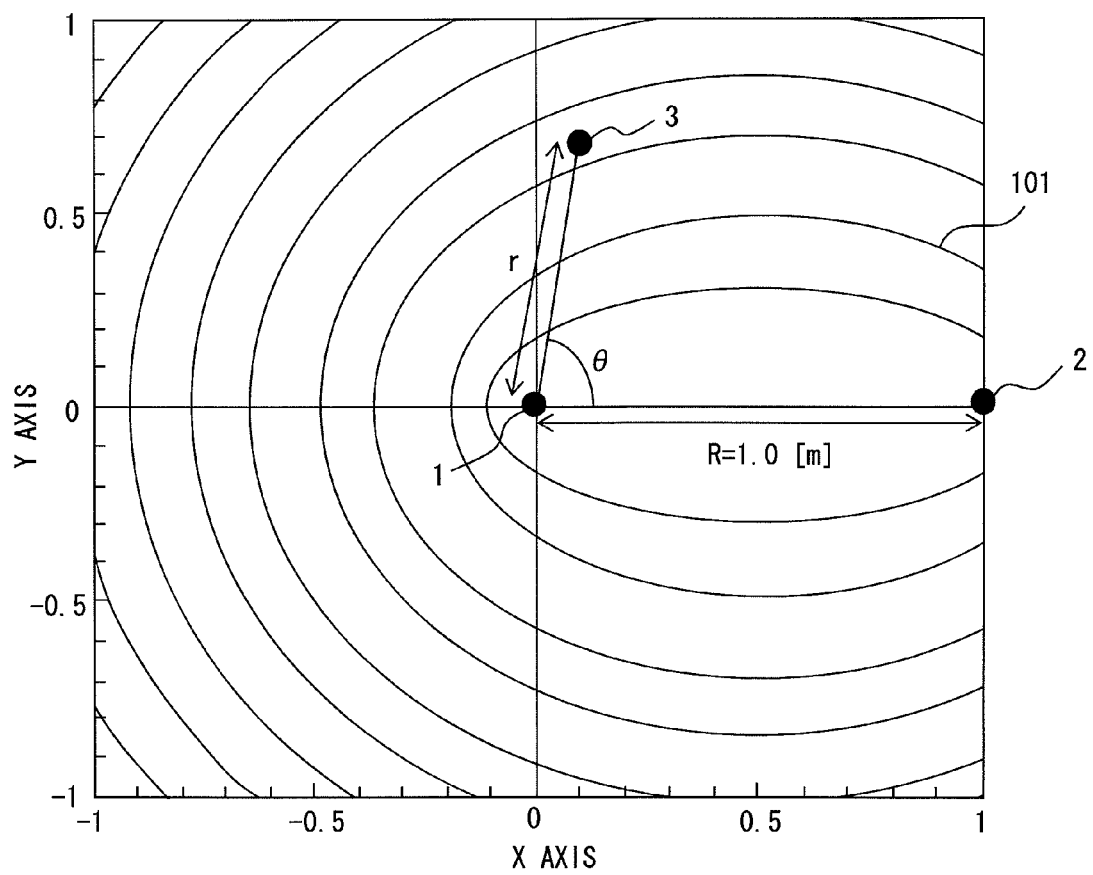
FIG. 14 is a view illustrating a problem in the wireless communication system according to the first embodiment.

Thus, because $D^2=R^2+r^2-2Rr\cos\theta$ from the equations 2, 6 and 7 and the cosine formula, when the distance between the first radio equipment 1 and the second radio equipment 2 is fixed to R=1[m], the area where the equation 2 is satisfied is indicated by the reference numeral 101 shown in FIG. 14.

As shown in FIG. 14, because the condition of the equation 2 is not satisfied in the area close to the first radio equipment 1 and the second radio equipment 2, the problem caused by no variation in the amplitude, that is, the problem that data cannot be transmitted using the data transmitter 3 due to no variation in the bit error rate, does not occur. On the other hand, when the data transmitter 3 is placed in the area at a distance from the first radio equipment 1 and the second radio equipment 2, there is a case where the condition of the above equation 2 is satisfied, and therefore the problem caused by no variation in the amplitude can occur. In such a case, solutions described hereinbelow are required.

Figure 15:
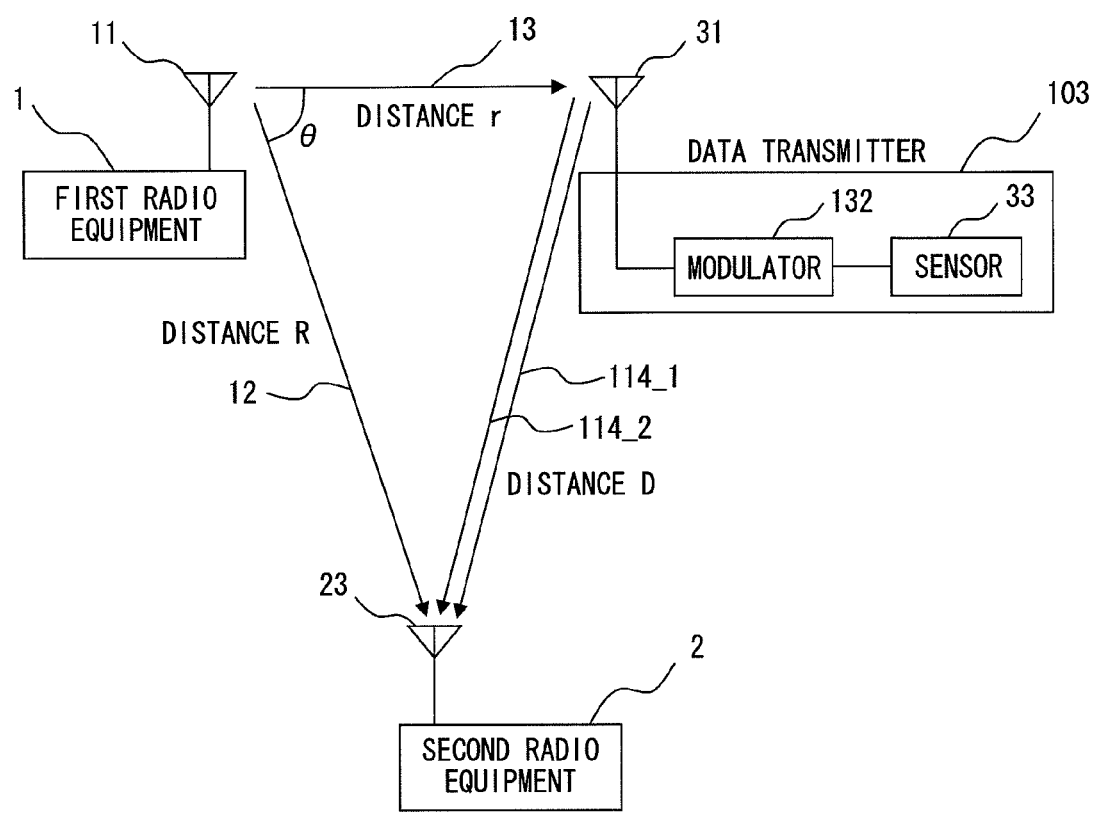
FIG. 15 is a block diagram showing a wireless communication system according to a fifth embodiment.

FIG. 15 is a block diagram showing a wireless communication system according to this embodiment. As shown in FIG. 15, the wireless communication system according to this embodiment is different from the wireless communication system described in the first embodiment in the configuration of a modulator 132 included in a data transmitter 103. This embodiment is the same as the first embodiment except for this point, and therefore the same elements are denoted by the same reference numerals and not redundantly described.

As shown in FIG. 15, the data transmitter 103 in the wireless communication system according to this embodiment includes an antenna 31, a modulator 132, and a sensor 33. The data transmitter 103 receives the first radio wave 13 that is output from the first radio equipment 1 using the antenna 31, generates second radio waves 114_1 and 114_2 by modulating the first radio wave 13 according to the second data to be transmitted using the modulator 132, and then outputs the second radio waves 114_1 and 114_2.

Specifically, in this embodiment, the modulator 132 included in the data transmitter 103 generates and outputs the second radio wave 114_1 generated by modulating the first radio wave 13 according to the second data to be transmitted and the second radio wave 114_2 generated by modulating the first radio wave 13 according to the second data to be transmitted and further shifting the phase. The phase shift is typically a phase delay. The propagation distances of the second radio wave 114_1 and the second radio wave 114_2 are both D. Then, the second radio waves 114_1 and 114_2 are both received by the second radio equipment 2.

FIG. 16A is a block diagram showing details of the data transmitter 103 in the wireless communication system according to the embodiment. As shown in FIG. 16A, the modulator 132 included in the data transmitter 103 includes load modulators 134 and 135 and a phase shifter 136.

The modulator 132 receives the first radio wave 13 that is output from the first radio equipment 1 by the antenna 31, generates the second radio wave 114_1 by performing load modulation of the first radio wave 13 by the load modulators 134 according to the second data generated by the sensor 33, and then outputs the second radio wave 114_1. Further, the modulator 132 receives the first radio wave 13 that is output from the first radio equipment 1 by the antenna 31, generates the second radio wave 114_2 by performing load modulation of the first radio wave 13 by the load modulator 135 according to the second data generated by the sensor 33, and then outputs the second radio wave 114_2. Because the phase shifter 136 is placed between the antenna 31 and the load modulator 135, the output second radio wave 114_2 is delayed.

FIG. 16B is a view showing an example of a specific circuit of the data transmitter 103 shown in FIG. 16A. As shown in FIG. 16B, the load modulator 134 included in the modulator 132 includes a capacitor C1, a capacitor C2, and a transistor Tr1 (e.g. N-type). One end of the capacitor C1 is connected to the antenna 31, and the other end thereof is connected to the ground. One end of the capacitor C2 is connected to the antenna 31, and the other end thereof is connected to the drain of the transistor Tr1. The drain of the transistor Tr1 is connected to the other end of the capacitor C2, the gate is connected to the output of the sensor 33, and the source is connected to the ground.

The load modulator 135 includes a capacitor C3, a capacitor C4, and a transistor Tr2 (e.g. N-type). One end of the capacitor C3 is connected to the phase shifter 136, and the other end thereof is connected to the ground. One end of the capacitor C4 is connected to the phase shifter 136, and the other end thereof is connected to the drain of the transistor Tr2. The drain of the transistor Tr2 is connected to the other end of the capacitor C4, the gate is connected to the output of the sensor 33, and the source is connected to the ground.

The phase shifter 136 includes a resistor R1 and a capacitor C5. One end of the resistor R1 is connected to the antenna 31, and the other end thereof is connected to the load modulator 135. One end of the capacitor C5 is connected to the load modulator 135, and the other end thereof is connected to the ground.

Note that the operation of the circuit shown in FIG. 16B is the same as the operation of the data transmitter 103 shown in FIG. 16A. Further, the data transmitter 103 may include the power generator 34 as in the wireless communication system according to the first embodiment shown in FIG. 3.

The data transmitter 103 having the above-described configuration outputs the second radio wave 114_1 and the second radio wave 114_2 with different phases from each other. A phase delay $\Delta t$ is added to the second radio wave 114_2 by the phase shifter 136. Therefore, a phase delay between a signal by the first radio wave 12 that directly reaches the second radio equipment 2 from the first radio equipment 1 and a signal by the second radio wave 114_2 (with delay) that reaches the second radio equipment 2 via the data transmitter 103 from the first radio equipment 1 can be represented by the following equation 8.

$$\Delta\phi' = 2\pi f\left(\frac{r+D-R}{c}+\Delta t\right) \quad \text{Equation 8}$$

Figure 17:
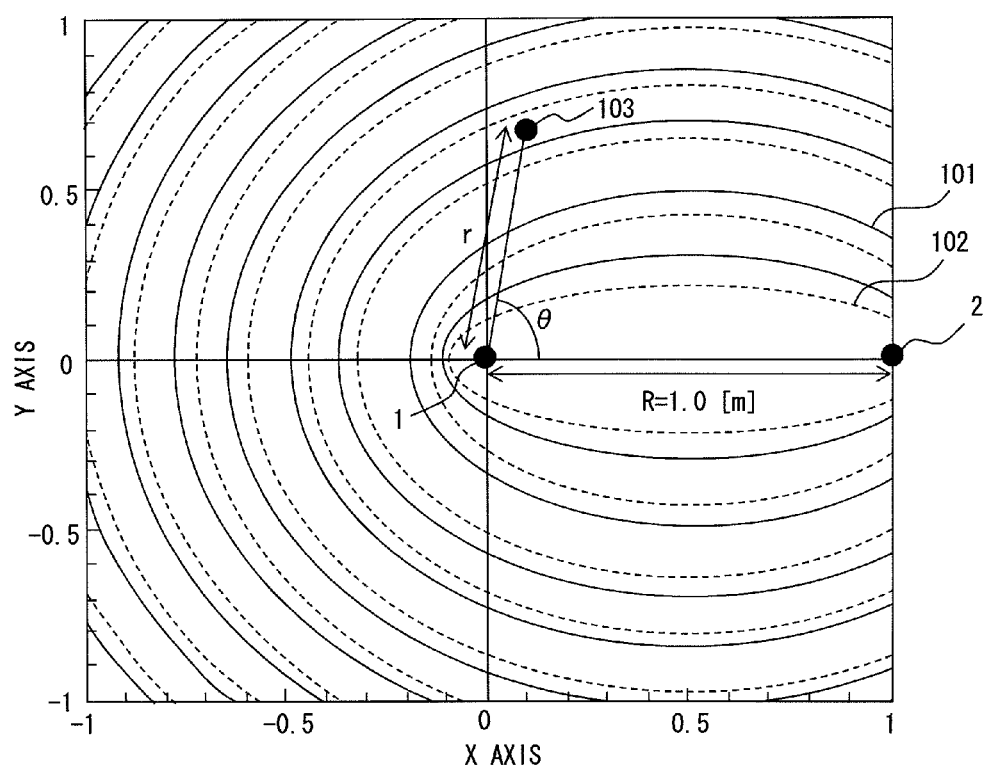
FIG. 17 is a view illustrating a case where the condition of equation 2 is satisfied in the wireless communication system according to the fifth embodiment.

As described above, because $D^2=R^2+r^2-2Rr\cos\theta$ from the equations 2, 6 and 8 and the cosine formula, when the distance between the first radio equipment 1 and the second radio equipment 2 is fixed to R=1[m], the area where the equation 2 is satisfied is indicated by the reference numeral 102 (indicated by the dashed line) shown in FIG. 17.

Specifically, the area indicated by the reference numeral 101 (indicated by the solid line) shown in FIG. 17 corresponds to the area indicated by the reference numeral 101 shown in FIG. 14, and thus corresponds to the area where the condition of the above equation 2 is satisfied which is generated by the second radio wave 114_1 without delay. On the other hand, the area indicated by the reference numeral 102 (indicated by the dashed line) shown in FIG. 17 corresponds to the area where the condition of the above equation 2 is satisfied which is generated by the second radio wave 114_2 to which the phase delay Δt is added by the modulator 132.

Because the second radio wave 114_1 transmitted from the data transmitter 103 satisfies the condition of the equation 2 in the area indicated by the reference numeral 101 (the solid line), data cannot be transmitted using the second radio wave 114_1. On the other hand, because the second radio wave 114_2 to which the phase delay Δt is added does not satisfy the condition of the equation 2 in the area indicated by the reference numeral 101 (the solid line), data can be transmitted using the second radio wave 114_2.

Likewise, because the second radio wave 114_2 transmitted from the data transmitter 103 satisfies the condition of the equation 2 in the area indicated by the reference numeral 102 (the dashed line), data cannot be transmitted using the second radio wave 114_2. On the other hand, because the second radio wave 114_1 does not satisfy the condition of the equation 2 in the area indicated by the reference numeral 102 (the dashed line), data can be transmitted using the second radio wave 114_1.

Note that when the phase delay Δt coincides with the signal period 1/f, the phases of the second radio wave 114_1 and the second radio wave 114_2 overlap. In this case, it is not possible to overcome the problem that data cannot be transmitted using the data transmitter. It is therefore necessary to prevent the phase delay Δt and the signal period 1/f from coinciding with each other. Further, even when the phases of the second radio wave 114_1 and the second radio wave 114_2 do not overlap, when these phases are close, the amount of noise increases in the communication performed by the data transmitter. It is therefore necessary to set the phase delay so that the phases of the second radio wave 114_1 and the second radio wave 114_2 are not close to each other. On the contrary, the overlap of the phases of the second radio wave 114_1 and the second radio wave 114_2 is the smallest when the phase delay Δt is half the signal period 1/f. In light of this point, it is preferred to configure the phase shifter 136 to produce the phase delay Δt which is half the signal period 1/f. Note that the phase delay Δt in the phase shifter 136 can be varied as appropriate by changing the resistance of the resistor R1 and the capacitance of the capacitor C5.

Further, in the above-described embodiment, the case where the data transmitter 103 outputs two second radio waves 114_1 and 114_2 having different phases from each other is described. However, the number of second radio waves having different phases which are output from the data transmitter 103 may be two or more. Thus, it is possible to overcome the problem that data cannot be transmitted using the data transmitter as long as the data transmitter 103 outputs at least two radio waves having different phases.

As described above, according to the embodiment of the present invention, it is possible to provide the wireless communication system in which data can be consistently transmitted regardless of the position of the data transmitter.

Sixth Embodiment

A sixth embodiment of the present invention is described hereinbelow. Like the fifth embodiment, this embodiment also provides a solution to the problem that data cannot be transmitted using the data transmitter when the condition of the above equation 2 is satisfied. In the wireless communication system according to this embodiment, the configuration of the data transmitter is different from the configuration of the data transmitter 103 described in the fifth embodiment shown in FIG. 15. The other configuration is the same as that of the fifth embodiment shown in FIG. 15, and therefore redundant explanation is omitted.

FIG. 18A is a block diagram showing a data transmitter 203 that is included in the wireless communication system according to this embodiment. As shown in FIG. 18A, the data transmitter 203 includes antennas 31_1 and 31_2, a modulator 232, and a sensor 33. The sensor 33 has the same configuration as that of the first embodiment. The modulator 232 includes a load modulator 234 and a phase shifter 236.

The modulator 232 receives the first radio wave 13 that is output from the first radio equipment 1 by the antenna 31_1, generates the second radio wave 114_1 by performing load modulation of the first radio wave 13 by the load modulators 234 according to the second data generated by the sensor 33, and outputs the second radio wave 114_1 from the antenna 31_1. Further, the modulator 232 receives the first radio wave 13 that is output from the first radio equipment 1 by the antenna 31_2, generates the second radio wave 114_2 by performing load modulation of the first radio wave 13 by the load modulators 234 according to the second data generated by the sensor 33, and outputs the second radio wave 114_2 from the antenna 31_2. Because the phase shifter 236 is placed between the antenna 31_2 and the load modulator 234, the output second radio wave 114_2 is delayed.

Further, because the distance between the antenna 31_1 and the antenna 31_2 is sufficiently short, the distance between the antenna 31_1 and the first radio equipment 1 and the distance between the antenna 31_2 and the first radio equipment 1 are both r. Likewise, the distance between the antenna 31_1 and the second radio equipment 2 and the distance between the antenna 31_2 and the second radio equipment 2 are both D.

In this embodiment, like the fifth embodiment, the data transmitter 203 can output at least two second radio waves 114_1 and 114_2 having different phases, and it is therefore possible to overcome the problem that data cannot be transmitted using the data transmitter the condition of the above equation 2 is satisfied.

FIG. 18B is a view showing an example of a specific circuit of the data transmitter 203 shown in FIG. 18A. As shown in FIG. 18B, the load modulator 234 included in the modulator 232 includes a capacitor C6, a capacitor C7, and a transistor Tr3 (e.g. N-type). One end of the capacitor C6 is connected to the antenna 31_1, and the other end thereof is connected to the ground. One end of the capacitor C7 is connected to the antenna 31_1, and the other end thereof is connected to the drain of the transistor Tr3. The drain of the transistor Tr3 is connected to the other end of the capacitor C7, the gate is connected to the output of the sensor 33, and the source is connected to the ground.

The phase shifter 236 includes a resistor R2 and a capacitor C8. One end of the resistor R2 is connected to the antenna 31_2, and the other end thereof is connected to the load modulator 234. One end of the capacitor C8 is connected to the load modulator 234, and the other end thereof is connected to the ground.

Note that the operation of the circuit shown in FIG. 18B is the same as the operation of the data transmitter 203 shown in FIG. 18A. Further, the data transmitter 203 may include the power generator 34 as in the wireless communication system according to the first embodiment shown in FIG. 3.

Further, in this embodiment, the phase delay Δt is produced by the component (the second radio wave 114_1) reflected by the antenna 31_1 and the component (the second radio wave 114_2) reflected by the antenna 31_2. Therefore, a delay may be added to the component reflected by the antenna 31_2 using the parasitic inductance, parasitic resistance and parasitic capacitance of the antenna 31_2, without placing the phase shifter 236.

However, in this case, in order prevent the occurrence of interference between the antenna 31_1 and the antenna 31_2 to inhibit communication, it is preferred to allow sufficient spacing between the antennas, or arrange the antennas orthogonal to each other in such a way that the null point of the antenna 31_1 corresponds to the lobe of the antenna 31_2. Further, in this case, because a delay added to the signal is different between the antenna 31_1 and the antenna 31_2, there arises a difference in the shape, such as the turns of winding or the area, of the antennas. This is thus different from the existing diversity antennas having the same shape.

As described above, according to the embodiment of the present invention, it is possible to provide the wireless communication system in which data can be consistently transmitted regardless of the position of the data transmitter.

Seventh Embodiment

A seventh embodiment of the present invention is described hereinbelow. Like the fifth embodiment, this embodiment also provides a solution to the problem that data cannot be transmitted using the data transmitter when the condition of the above equation 2 is satisfied. In the wireless communication system according to this embodiment, the configuration of the data transmitter is different from the configuration of the data transmitter 103 described in the fifth embodiment shown in FIG. 15. The other configuration is the same as that of the fifth embodiment shown in FIG. 15, and therefore redundant explanation is omitted.

Figure 19A:
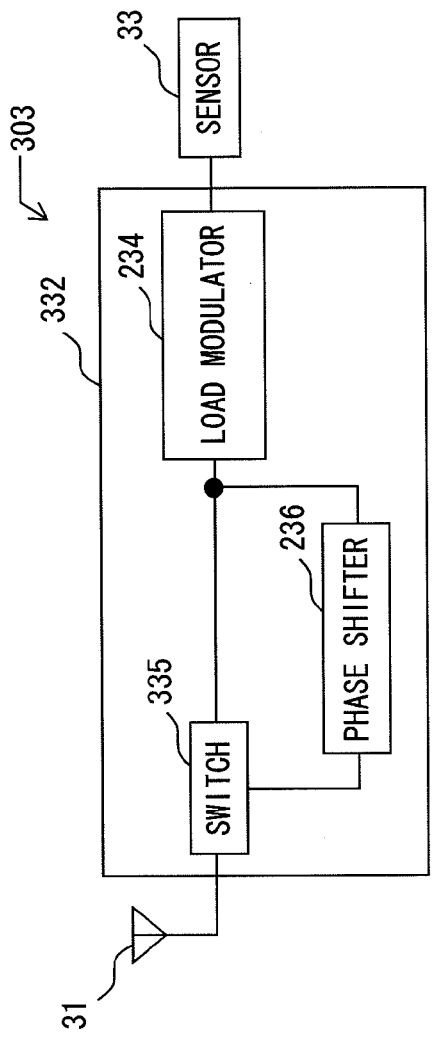
FIG. 19A is a block diagram showing a data transmitter included in a wireless communication system according to a seventh embodiment.
Figure 19B:
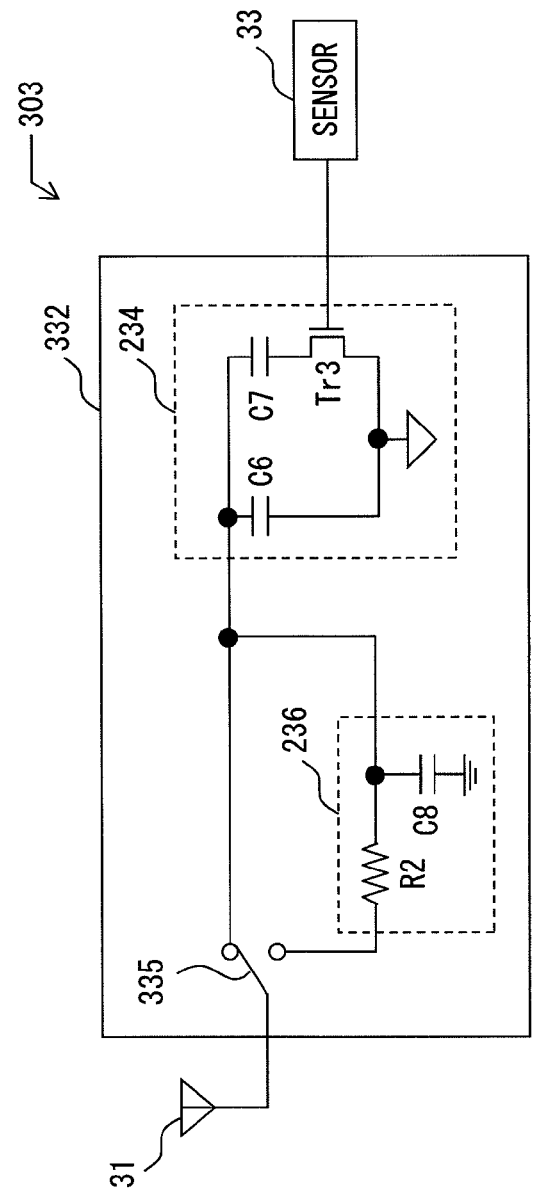
FIG. 19B is a view showing an example of a specific circuit of the data transmitter shown in FIG. 19A.

FIG. 19A is a block diagram showing a data transmitter 303 included in a wireless communication system according to this embodiment. As shown in FIG. 19A, the data transmitter 303 includes an antenna 31, a modulator 332, and a sensor 33. The sensor 33 has the same configuration as that of the first embodiment. The modulator 332 includes a load modulator 234, a switch 335, and a phase shifter 236. FIG. 19B is a view showing an example of a specific circuit of the data transmitter 303 shown in FIG. 19A. The configuration and operation of the load modulator 234 and the phase shifter 236 are the same as the configuration and operation of the load modulator 234 and the phase shifter 236 described in the sixth embodiment (cf. FIGS. 18A and 18B).

The switch 335 shown in FIGS. 19A and 19B connects the antenna 31 and the load modulator 234 for a first period. Further, the switch 335 connects the antenna 31 and the phase shifter 236 for a second period.

During the first period, the modulator 332 receives the first radio wave 13 that is output from the first radio equipment 1 by the antenna 31, generates the second radio wave 114_1 by performing load modulation of the first radio wave 13 by the load modulators 234 according to the second data generated by the sensor 33, and then outputs the second radio wave 114_1 from the antenna 31.

Further, during the second period, the modulator 332 receives the first radio wave 13 that is output from the first radio equipment 1 by the antenna 31, generates the second radio wave 114_2 by performing load modulation of the first radio wave 13 by the load modulators 234 according to the second data generated by the sensor 33, and then outputs the second radio wave 114_2 from the antenna 31. Because the phase shifter 236 is placed between the antenna 31 and the load modulator 234, the output second radio wave 114_2 is delayed.

In this embodiment, the operation in the first period and the operation in the second period are repeated alternately, so that the second radio wave 114_1 and the delayed second radio wave 114_2 are output by time division. Specifically, when a predetermined transfer period of the first data by the first radio wave 13 is T, the first period is t1, and the second period is t2, the relation of T=t1+t2 is established. The data transmitter 303 outputs the second radio wave 114_1 during the first period t1 and outputs the delayed second radio wave 114_2 during the second period t2. In this case, the rate of the time division needs to be higher than the data communication rate of the data transmitted from the data transmitter 303.

As described above, in this embodiment, the second radio wave 114_1 and the delayed second radio wave 114_2 are output from the data transmitter 303 in a time division manner. Therefore, in the area where the condition of the above equation 2 is satisfied (the area indicated by the reference numerals 101 and 102 in FIG. 17), the data transfer rate from the data transmitter is t2/T compared to the case of the sixth embodiment.

On the other hand, because the second radio wave 114_1 and the delayed second radio wave 114_2 can be output in a time division manner in this embodiment, the number of antennas can be reduced compared to the case of the sixth embodiment. The area of the antennas in the data transmitter can be thereby reduced. This effect is significant when the frequency of the wireless communication system is low and the antenna is large, for example.

Eighth Embodiment

An eighth embodiment of the present invention is described hereinbelow. Like the fifth embodiment, this embodiment also provides a solution to the problem that data cannot be transmitted using the data transmitter when the condition of the above equation 2 is satisfied. In the wireless communication system according to this embodiment, the configuration of the data transmitter is different from the configuration of the data transmitter 103 described in the fifth embodiment shown in FIG. 15. The other configuration is the same as that of the fifth embodiment shown in FIG. 15, and therefore redundant explanation is omitted.

Figure 20A:
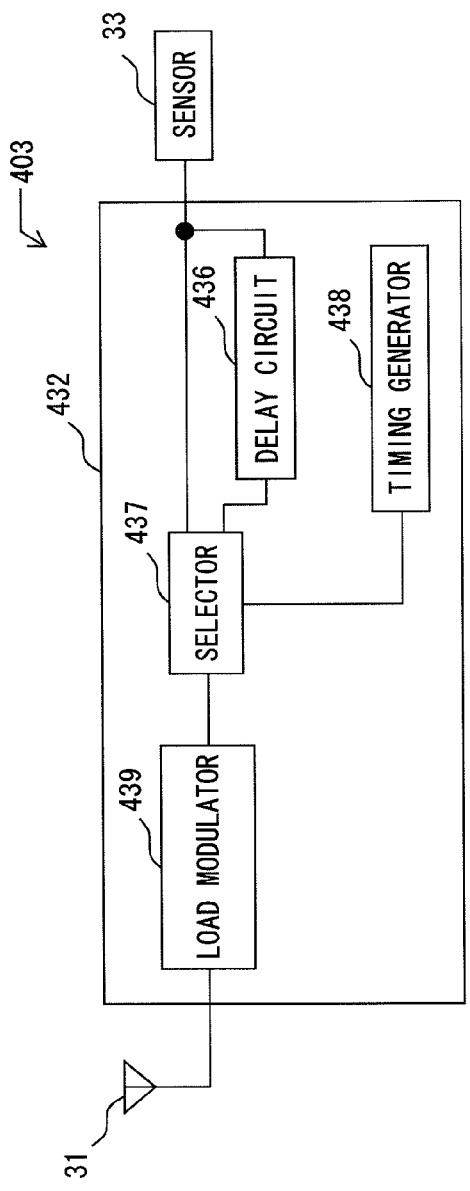
FIG. 20A is a block diagram showing a data transmitter included in a wireless communication system according to an eighth embodiment.

FIG. 20A is a block diagram showing a data transmitter 403 included in a wireless communication system according to this embodiment. As shown in FIG. 20A, the data transmitter 403 includes an antenna 31, a modulator 432, and a sensor 33. The modulator 432 includes a delay circuit 436, a selector 437, a timing generator 438, and a load modulator 439.

Second data generated by the sensor 33 and second data (with delay) generated by the sensor 33 and delayed by the delay circuit 436 are supplied to the selector 437. Further, a timing signal generated by the timing generator 438 is also supplied to the selector 437. Then, the selector 437 outputs either one of the second data generated by the sensor 33 or the delayed second data generated by the sensor 33 and delayed by the delay circuit 436 to the load modulator 439 according to the timing signal generated by the timing generator 438.

For example, the selector 437 outputs the second data generated by the delay circuit 436 to the load modulator 439 during the first period. Further, the selector 437 outputs the delayed second data generated by the sensor 33 and delayed by the delay circuit 436 to the load modulator 439 during the second period.

During the first period, the load modulator 439 generates the second radio wave 114_1 by performing load modulation of the first radio wave 13 received by the antenna 31 according to the second data output from the selector 437, and then outputs the second radio wave 114_1 from the antenna 31. Further, during the second period, the load modulator 439 generates the second radio wave 114_2 by performing load modulation of the first radio wave 13 received by the antenna 31 according to the delayed second data output from the selector 437, and then outputs the second radio wave 114_2 from the antenna 31.

Figure 20B:
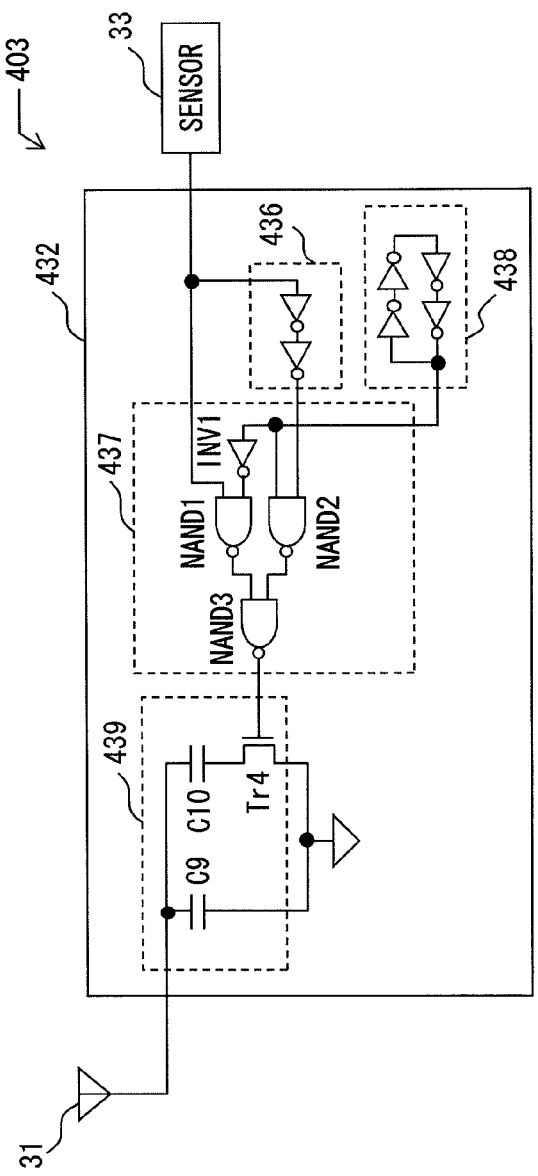
FIG. 20B is a view showing an example of a specific circuit of the data transmitter shown in FIG. 20A.

FIG. 20B is a view showing an example of a specific circuit of the data transmitter 403 shown in FIG. 20A. As shown in FIG. 20B, the delay circuit 436 may be configured using two inverters. The timing generator 438 may be configured using a ring oscillator in which a plurality of inverters are connected in a ring shape. The selector 437 may be configured using NAND1 to NAND3 and an inverter INV1. The load modulator 439 may be configured using a capacitor C9, a capacitor C10, and a transistor Tr4.

In this embodiment, the operation in the first period and the operation in the second period are repeated alternately, so that the second radio wave 114_1 and the delayed second radio wave 114_2 are output by time division. Specifically, when a predetermined transfer period of the first data by the first radio wave 13 is T, the first period is t1, and the second period is t2, the relation of T=t1+t2 is established. The data transmitter 403 outputs the second radio wave 114_1 during the first period t1 and outputs the delayed second radio wave 114_2 during the second period t2. In this case, the timing generated by the timing generator 438, which is the rate of the time division, needs to be higher than the data communication rate of the data transmitted from the data transmitter 403.

As described above, in this embodiment, the second radio wave 114_1 and the delayed second radio wave 114_2 are output from the data transmitter 403 in a time division manner. Therefore, in the area where the condition of the above equation 2 is satisfied (the area indicated by the reference numerals 101 and 102 in FIG. 17), the data transfer rate from the data transmitter is t2/T compared to the case of the sixth embodiment.

On the other hand, because the second radio wave 114_1 and the delayed second radio wave 114_2 can be output in a time division manner in this embodiment, the number of antennas can be reduced compared to the case of the sixth embodiment. The area of the antennas in the data transmitter can be thereby reduced. This effect is significant when the frequency of the wireless communication system is low and the antenna is large, for example.

Other Embodiments

Other embodiments are described hereinbelow.

The data transmitter described in each of the above embodiments may be fabricated on a semiconductor chip. Specifically, the circuits (the modulator, the sensor etc.) that constitute the data transmitter may be fabricated on a semiconductor chip. In this case, the antenna may be formed on the same chip as the semiconductor chip on which the circuits of the data transmitter are formed. Alternatively, the antenna may be formed separately from the semiconductor chip on which the circuits of the data transmitter are formed.

Figure 21A:
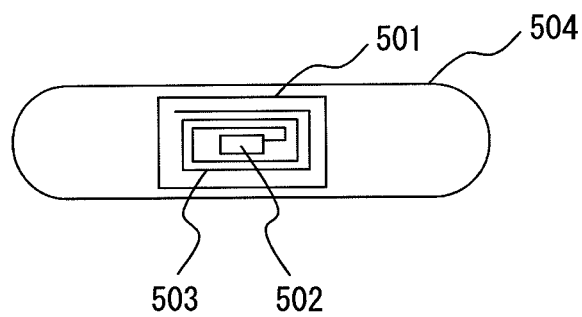
FIG. 21A is a view illustrating a case where a data transmitter is attached to an adhesive member.

Referring to FIG. 21A, a data transmitter 501 fabricated using a semiconductor chip can be attached to an object to be measured using an adhesive member 504. An adhesive tape may be used as the adhesive member 504, for example. The data transmitter 501 includes circuits 502 that constitute the data transmitter and an antenna 503. For example, when the data transmitter 501 incorporates a temperature sensor, the temperature of an object to be measured can be checked easily by attaching the chip-like data transmitter 501 to the adhesive member 504 and attaching the adhesive member 504 to the object to be measured.

Note that the adhesive member becomes unusable after the lapse of a given length of time because it loses adhesion over time. On the other hand, the product life of the data transmitter 501 is long. Therefore, if the adhesive member 504 is formed to allow detachment of the data transmitter 501, the data transmitter 501 can be reused. For example, the data transmitter 501 can be detached if the adhesive member 504 is designed to have a pocket.

Figure 21B:
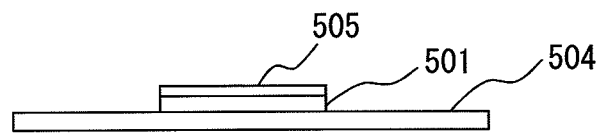
FIG. 21B is a cross-sectional view illustrating a case where the data transmitter is attached to an adhesive member.

FIG. 21B is a cross-sectional view of the adhesive member. As shown in FIG. 21B, when the data transmitter 501 includes a temperature sensor, it is preferred to use material with a high thermal conductivity as a member 505 that is interposed between the data transmitter 501 attached to the adhesive member 504 and an object to be measured. Use of material with a high thermal conductivity enables accurate measurement of the temperature of the object to be measured. As the material with a high thermal conductivity, metal material such as copper, resin material having a high thermal conductivity and the like may be used, for example.

Further, the data transmitter may be incorporated into a thermometer. In this case, a temperature sensor in the thermometer may be used as the sensor of the data transmitter. By incorporating the data transmitter into the thermometer, the history of the temperature of an object to be measured can be transmitted to the second radio equipment 2.

The features of the data transmitter described in the above embodiments are described hereinafter.

The data transmitter according to one embodiment of the invention includes a sensor for acquiring data to be transmitted and a modulator that modulates a first radio wave used in a wireless network according to the data to be transmitted and thereby generates a second radio wave causing a disturbance on the first radio wave.

The data transmitter according to one embodiment of the invention outputs at least two second radio waves with different phases.

The modulator generates the second radio wave generated by modulating the first radio wave according to the second data to be transmitted, and the second radio wave generated by modulating the first radio wave according to the second data to be transmitted and further shifting a phase.

As shown in FIG. 16A, the modulator 132 includes the load modulator 134 that performs load modulation of the first radio wave 13 received by the antenna 31 according to the second data generated by the sensor 33, the load modulator 135 that performs load modulation of the first radio wave 13 received by the antenna 31 according to the second data generated by the sensor 33, and the phase shifter 136 placed between the antenna 31 and the load modulator 135. The second radio wave 114_2 that is load-modulated by the load modulator 135 and output from the antenna 31 is delayed.

As shown in FIG. 18, the data transmitter according to one embodiment of the invention includes the antennas 31_1 and 31_2 that receive the first radio wave 13, the load modulator 234 that performs load modulation of the first radio wave 13 received by the antennas 31_1 and 31_2 according to the second data generated by the sensor 33, and the phase shifter 236 placed between the antenna 31_2 and the load modulator 234. The second radio wave 114_2 that is load-modulated by the load modulator 234 and output from the antenna 31_2 is delayed.

As shown in FIG. 19A, the modulator 332 includes the load modulator 234 that performs load modulation of the first radio wave 13 received by the antenna 31 according to the second data generated by the sensor 33, and the switch 335 that connects the antenna 31 and the load modulator 234 for the first period and connects the antenna 31 and the load modulator 234 via phase shifter 236 for the second period. During the first period, the load-modulated second radio wave 114_1 is output from the antenna 31. During the second period, the load-modulated and delayed second radio wave 114_2 is output from the antenna 31.

As shown in FIG. 20A, the modulator 432 includes the selector 437 that is supplied with the second data generated by the sensor 33 and the second data generated by the sensor 33 and delayed by the delay circuit 436 and outputs either one of the second data or the delayed second data according to the timing signal generated by the timing generator 438, and the load modulator 434 that performs load modulation of the first radio wave 13 received by the antenna 31 according to the output of the selector 437. During the period when the selector 437 outputs the delayed second data, the load-modulated and delayed second radio wave 114_2 is output from the antenna 31.

Further, the data transmitter is formed on a semiconductor chip.

Next, the features of the second radio equipment described in the above embodiments are described.

The second radio equipment according to one embodiment of the invention includes a separator/demodulator that receives a first radio wave containing first data and a second radio wave generated by modulating the first radio wave according to second data, the second radio wave causing a disturbance on the first radio wave, and separates and demodulates the first data and the second data contained in the received radio waves based on a bit error rate of the first radio wave.

The separator/demodulator included in the second radio equipment according to one embodiment of the invention includes a demodulator that demodulates the first data and an error rate evaluator that evaluates a bit error rate after the first data is demodulated and demodulates the second data based on a time variation of the bit error rate.

The separator/demodulator included in the second radio equipment according to one embodiment of the invention is configured by conducting software processing on a protocol processing unit included in the second radio equipment.

The first to eighth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A wireless communication system comprising:
    a first radio equipment that transmits first data using a first radio wave;
    a data transmitter that outputs a second radio wave generated by modulating the first radio wave according to second data to be transmitted; and
    a second radio equipment including a separator/demodulator that receives the first radio wave and the second radio wave, and separates and demodulates the first data transmitted from the first radio equipment and the second data transmitted from the data transmitter contained in the received radio waves,
    wherein the data transmitter makes a variation to a bit error rate of the first radio wave by causing a disturbance on the first radio wave according to the second data, and
    the second radio equipment demodulates the second data transmitted from the data transmitter based on the variation in the bit error rate of the first radio wave.

2. The wireless communication system according to claim 1, wherein
    the data transmitter generates the second radio wave by performing load modulation of the first radio wave.

3. The wireless communication system according to claim 1, wherein
    the data transmitter makes a variation to the bit error rate of the first radio wave within a range lower than a wireless specification value for the bit error rate.

4. The wireless communication system according to claim 1, wherein
    a modulation cycle of a bit error rate for transmission of the second data is slower than a modulation cycle of the first radio wave for transmission of the first data.

5. The wireless communication system according to claim 1, wherein
    the separator/demodulator included in the second radio equipment includes
    a demodulator that demodulates the first data transmitted from the first radio equipment, and
    an error rate evaluator that evaluates a bit error rate after the first data transmitted from the first radio equipment is demodulated, and demodulates the second data transmitted from the data transmitter based on a time variation of the bit error rate.

6. The wireless communication system according to claim 5, wherein
    the error rate evaluator demodulates the second data transmitted from the data transmitter by using at least one of a bit error rate of frame processing output, a bit error rate of soft decision and Viterbi output, and a bit error rate of demapping output, after the first data transmitted from the first radio equipment is demodulated.

7. The wireless communication system according to claim 6, wherein
    the error rate evaluator performs at least one of majority decision and code spreading on at least one of the bit error rate of frame processing output, the bit error rate of soft decision and Viterbi output, and the bit error rate of demapping output.

8. The wireless communication system according to claim 5, wherein
    the error rate evaluator demodulates the second data transmitted from the data transmitter based on a difference between a bit error rate of frame processing output and a bit error rate of demapping output after the first data transmitted from the first radio equipment is demodulated.

9. The wireless communication system according to claim 1, wherein
    the wireless communication system includes a plurality of data transmitters, and
    the second radio equipment identifies a source of the second data based on identification information assigned to the second data by each of the plurality of data transmitters.

10. The wireless communication system according to claim 1, wherein
the data transmitter includes a sensor for acquiring the second data to be transmitted.

11. The wireless communication system according to claim 1, wherein
the data transmitter includes a power generator that generates a power using the first radio wave.

12. The wireless communication system according to claim 1, wherein
the separator/demodulator is configured by conducting software processing on a protocol processing unit included in the second radio equipment.

13. A wireless communication method for transmitting second data to a wireless network including a first radio equipment that transmits first data and a second radio equipment that receives the first data by using a data transmitter, the method comprising:
transmitting the first data from the first radio equipment using a first radio wave;
generating a second radio wave by modulating the first radio wave according to the second data and outputting the second radio wave by the data transmitter; and
receiving the first radio wave and the second radio wave, and separating and demodulating the first data transmitted from the first radio equipment and the second data transmitted from the data transmitter contained in the received radio waves by the second radio equipment,
wherein the data transmitter makes a variation to a bit error rate of the first radio wave by causing a disturbance on the first radio wave according to the second data, and
the second radio equipment demodulates the second data transmitted from the data transmitter based on the variation in the bit error rate of the first radio wave.

14. The wireless communication method according to claim 13, wherein
the data transmitter generates the second radio wave by performing load modulation of the first radio wave.

* * * * *